(12) United States Patent
Babaei

(10) Patent No.: US 11,864,032 B2
(45) Date of Patent: Jan. 2, 2024

(54) ENHANCED MOBILITY PROCEDURES

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 18/077,268

(22) Filed: Dec. 8, 2022

(65) Prior Publication Data

US 2023/0199571 A1 Jun. 22, 2023

Related U.S. Application Data

(60) Provisional application No. 63/290,607, filed on Dec. 16, 2021.

(51) Int. Cl.
| | |
|---|---|
| *H04W 36/00* | (2009.01) |
| *H04W 56/00* | (2009.01) |
| *H04W 74/08* | (2009.01) |

(52) U.S. Cl.
CPC ... *H04W 36/0016* (2013.01); *H04W 36/0058* (2018.08); *H04W 36/0072* (2013.01); *H04W 56/0015* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 2019/0253942 | A1* | 8/2019 | Yoo | H04W 36/04 |
| 2019/0297537 | A1* | 9/2019 | Tsai | H04W 36/0016 |
| 2022/0046510 | A1* | 2/2022 | Kung | H04L 5/0051 |
| 2022/0240208 | A1* | 7/2022 | Chien | H04W 16/28 |

OTHER PUBLICATIONS

3GPP TS 38.211 V16.7.0 (Sep. 2021); Technical Specification; 3rd Generation Partnership Project; Technical Specification Group Radio Access Network; NR; Physical channels and modulation; (Release 16).
3GPP TS 38.212 V16.7.0 (Sep. 2021); Technical Specification; 3rd Generation Partnership Project; Technical Specification Group Radio Access Network; NR; Multiplexing and channel coding; (Release 16).
3GPP TS 38.213 V16.7.0 (Sep. 2021); Technical Specification; 3rd Generation Partnership Project; Technical Specification Group Radio Access Network; NR; Physical layer procedures for control; (Release 16).

(Continued)

*Primary Examiner* — Jutai Kao
(74) *Attorney, Agent, or Firm* — Alireza Babaei

(57) ABSTRACT

A wireless device may receive measurement report(s) comprising measurement results associated with a second cell. The wireless device may determine, based on initiating a random access process prior to receiving a cell switch MAC CE, a timing advance value associated with the second cell. The wireless device may receive the cell switch MAC CE indicating switching from a first cell to the second cell. The wireless device may perform an uplink transmission on the second cell based on the timing advance value and in response to receiving the cell switch MAC CE.

14 Claims, 38 Drawing Sheets

(56) References Cited

OTHER PUBLICATIONS

3GPP TS 38.214 V16.7.0 (Sep. 2021); Technical Specification; 3rd Generation Partnership Project; Technical Specification Group Radio Access Network; NR; Physical layer procedures for data; (Release 16).
3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).
3GPP TS 38.321 V16.6.0 (Sep. 2021); Technical Specification; 3rd Generation Partnership Project; Technical Specification Group Radio Access Network; NR; Medium Access Control (MAC) protocol specification; (Release 16).
3GPP TS 38.331 V16.6.0 (Sep. 2021); Technical Specification; 3rd Generation Partnership Project; Technical Specification Group Radio Access Network; NR; Radio Resource Control (RRC); Protocol specification; (Release 16).
3GPP TSG RAN Meeting #93-e; RP-211653; Electronic Meeting, Sep. 13-17, 2021; Source: Title: Moderator's summary for discussion [RAN93e-R18Prep-3] Mobility enhancements; Agenda item: 9.0.1; Document for: Discussion and decision.
3GPP TSG RAN Meeting #94-e; RP-212670; Electronic Meeting, Dec. 6-17, 2021; Source: Mobility enhancements moderator (CMCC); Title: Moderator's summary for discussion [RAN94e-R18Prep-10] Mobility enhancements; Agenda item: 8A.2; Document for: Discussion and decision.
3GPP TSG RAN Meeting #94e; RP-212710; Electronic Meeting, Dec. 6-17, 2021; Source: Moderator (CMCC); Title: New WID: NR further mobility enhancements; Document for: Approval.
3GPP TSG-RAN Meeting #94 Electronic; RP-212950; Online, Dec. 6-17, 2021; Agenda item: 8A.2; Source: Nokia, Nokia Shanghai Bell, TELUS, Verizon, Telecom Italia; Title: Mobility related CA/DC enhancements in Release 18; Document for: Approval.
3GPP TSG RAN Meeting #94e; RP-213009; Electronic Meeting, Dec. 6-17, 2021; Agenda Item: 8A.2; Source: Intel Corporation; Title: Discussion on the scope of Rel-18 Further NR mobility enhancements; Document for: Discussion and Decision.
3GPP TSG RAN Meeting #94-e; RP-213221; Electronic Meeting, Dec. 6-17, 2021; Source: Huawei, HiSilicon; Title: Comments on Rel-18 mobility draft WID; Agenda item: 8A.2; Document for: Discussion and Decision.
3GPP TSG RAN Meeting #94e; RP-213357; Electronic Meeting, Dec. 6-17, 2021; Agenda Item: 8A.5; Source: MediaTek Inc.; Title: L1/L2-based Mobility Enhancements in Rel-18; Document for: Discussion and decision.
3GPP TSG RAN Meeting #94e; RP-213375; Electronic Meeting, Dec. 6-17, 2021; Source: Apple Inc .; Title: WID modification for Rel-18 Mobility Enhancements; Document for: Discussion/Approval.
3GPP TSG-RAN#94e; RP-213463; Electronic Meeting, Dec. 6-17, 2021; Agenda item: 8A.2; Source: ZTE, Sanechips; Title: Discussion on Rel-18 Mobility enhancement; Document for: Discussion and Decision.

3GPP TSG-RAN Meeting #94 Electronic; RP-213515; Online, Dec. 6-17, 2021; Agenda item: 8A.2; Source: Nokia, Nokia Shanghai Bell, TELUS, Verizon, Telecom Italia, Telefonica, KT; Title: Mobility related CA/DC; enhancements in Release 18; Document for: Approval.
3GPP TSG RAN Meeting #94e; RP-213565; Electronic Meeting, Dec. 6-17, 2021; Source: MediaTek; Title: New WID on Further NR mobility enhancements; Document for: Approval; Agenda Item: 8A.2.
3GPP TSG RAN Meeting #93-e; RP-211653; Electronic Meeting, Sep. 13-17, 2021; Title: Moderator's summary for discussion [RAN93e-R18Prep-3] Mobility enhancements; Agenda item: 9.0.1; Document for: Discussion and decision.
3GPP TSG RAN#93e; Electronic Meeting, Sep. 13-17, 2021; Agenda: 9.0.3; RP-211960; Further enhancement on NR mobility for Rel-18; China Telecom; Aug. 2021.
3GPP TSG RAN#93-e; RP-211961; Electronic Meeting, Sep. 13-17, 2021; Source: China Telecom; Title: Draft WID on further enhancement on NR mobility; Document for: Discussion; Agenda Item: 9.0.3.
3GPP TSG RAN Meeting #93-e; RP-212017; Electronic Meeting, Sep. 13-17, 2021; Source: vivo; Further mobility enhancements in Release 18; Document for: Discussion & Decision; Agenda Item: 9.0.3.
3GPP TSG RAN Meeting #93-e; RP-212067; Electronic Meeting, Sep. 13-17, 2021; Agenda item: 9.0.3; Source: Lenovo, Motorola Mobility; Title: Mobility enhancement In Rel-18; Document for: Discussion and Decision.
3GPP TSG RAN Meeting #93-e; RP-212067; Electronic Meeting, Sep. 13-17, 2021; Agenda item: 9.0.3; Source: Qualcomm; Views on Rel 18 Mobility enhancements; Document for: Discussion.
3GPP TSG RAN Meeting #93e; RP-212168; Electronic Meeting, Sep. 13-17, 2021; Source: Nokia, Nokia Shanghai Bell; Title: New WID on enhanced mobility procedures for L1 and FR2; Document for: Approval; Agenda Item: 9.0.3.
3GPP TSG RAN WG Meeting #93-e; RP-212245; Electronic Meeting, Sep. 13-17, 2021; Agenda Item: 9.0.3; Source: CATT; Title: On Rel-18 Mobility Enhancements; Document for: Discussion.
3GPP TSG RAN Meeting #93-e; RP-212277; Electronic Meeting, Sep. 13-17, 2021; Source: Huawei, HiSilicon; Title: Updated views on Rel-18 mobility enhancements; Agenda item: 9.0.3; Document for: Discussion and decision.
3GPP TSG RAN; RP-212328; Sep. 13-17, 2021 Agenda Item 9.0.3 Rel-18 Mobility Enhancements; MediaTek Inc.
3GPP TSG RAN #93-e; RP-212336; Sep. 13-17, 2021; Rel-18 Further Enhancements of NR Mobility; Agenda Item: 9.0.3; Source: Intel Corporation; Document for: Discussion.
3GPP TSG RAN #93-e; RP-212389; Electronic Meeting, Sep. 13-17, 2021; Source: ZTE, Sanechips; Agenda: 9.0.3; Discussion on Mobility enhancements.
3GPP TSG-RAN #93e; RP-212447; Electronic Meeting, Sep. 13-17, 2021; Agenda item: 9.0.3; Source: NEC; Title: Views on Rel-18 Mobility enhancements; Document for: Discussion and Decision.

* cited by examiner

| Cell or cell group ID1 | 0/1 |
|---|---|
| Cell or cell group ID2 | 0/1 |

... 1st indication MAC CE or DCI

FIG. 30

Transmit, by a 1st base station to a 2nd base station, a 1st message indicating a request associated with handover/inter-cell mobility based on L1/L2 signaling

3810

Receive, in response to transmitting the first message, a second message indicating accepting or denying the request.

3820

ENHANCED MOBILITY PROCEDURES

CROSS-REFERENCE TO RELATED APPLICATIONS

This application claims the benefit of U.S. Provisional Application No. 63/290,607, filed Dec. 16, 2021, which is hereby incorporated by reference in its entirety.

BRIEF DESCRIPTION OF THE DRAWINGS

FIG. 30 shows an example MAC CE or downlink control information in accordance with several of various embodiments of the present disclosure.

DETAILED DESCRIPTION

The exemplary embodiments of the disclosed technology enhance mobility procedures by a wireless device and/or one or more base stations. The exemplary disclosed embodiments may be implemented in the technical field of wireless communication systems. More particularly, the embodiments of the disclosed technology enhance inter-cell mobility procedures based on Layer 1/Layer 2 signaling The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
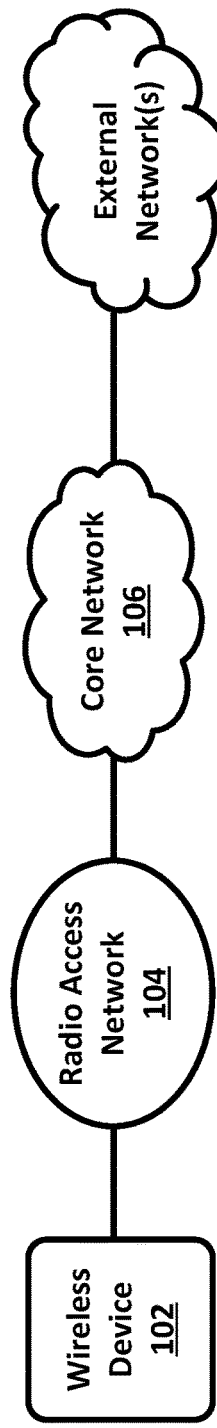
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
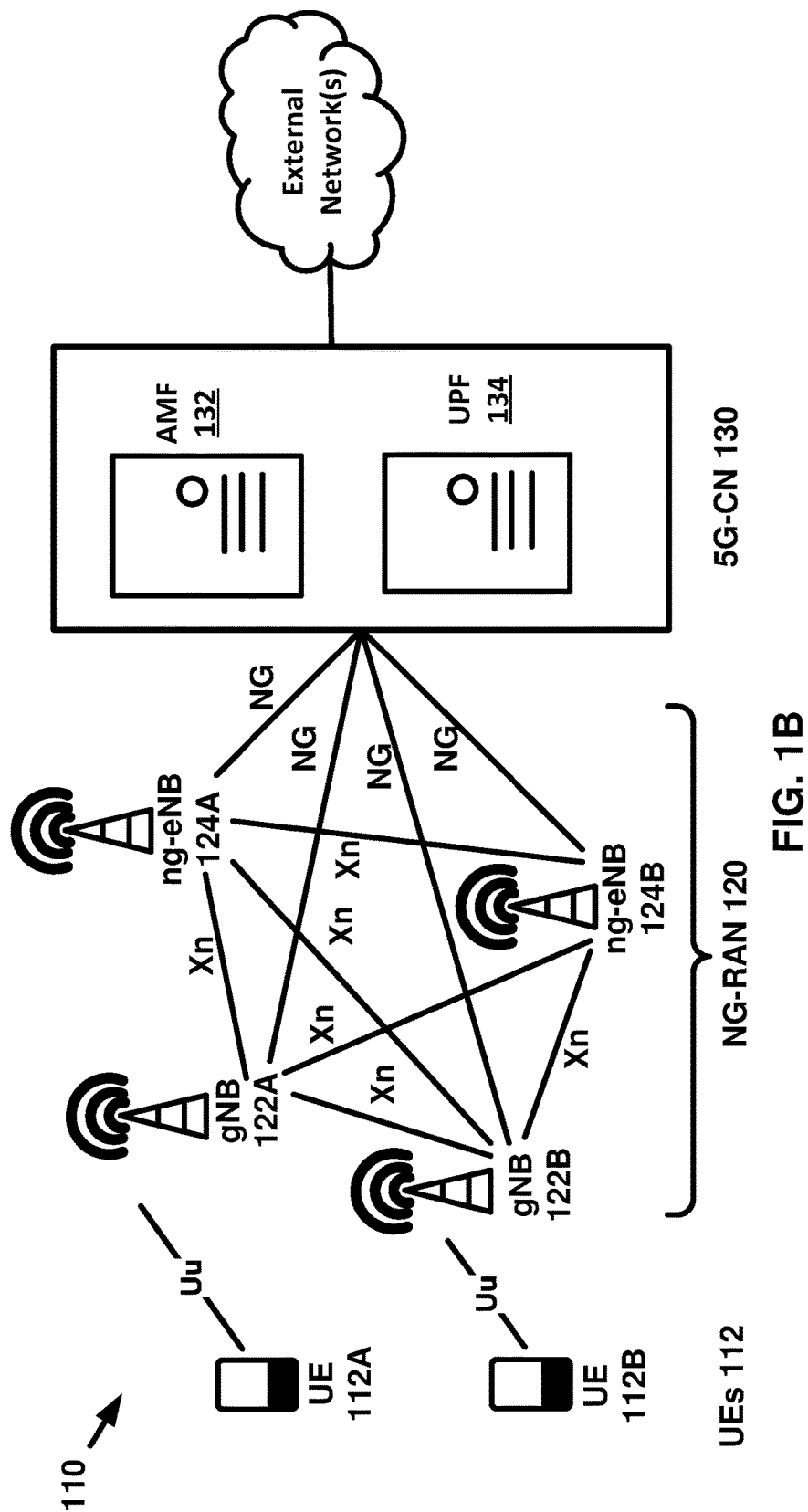

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
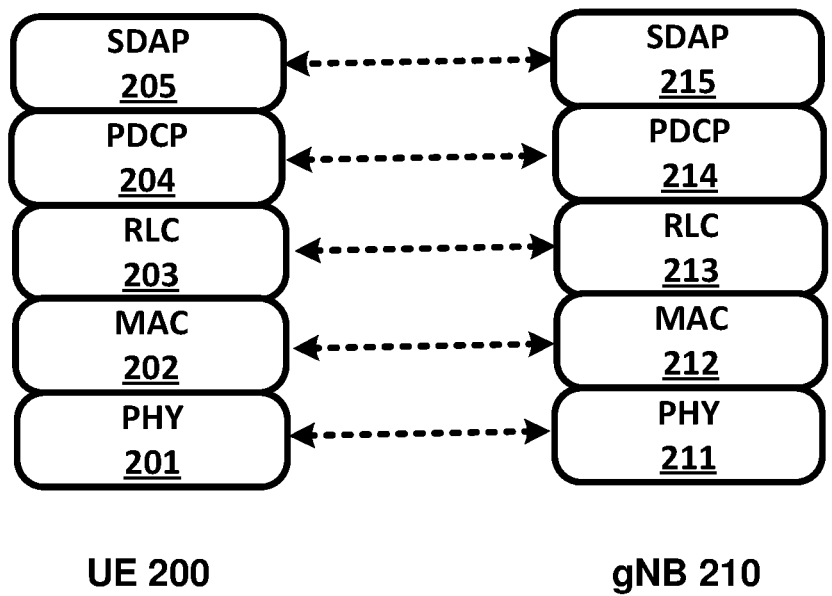
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
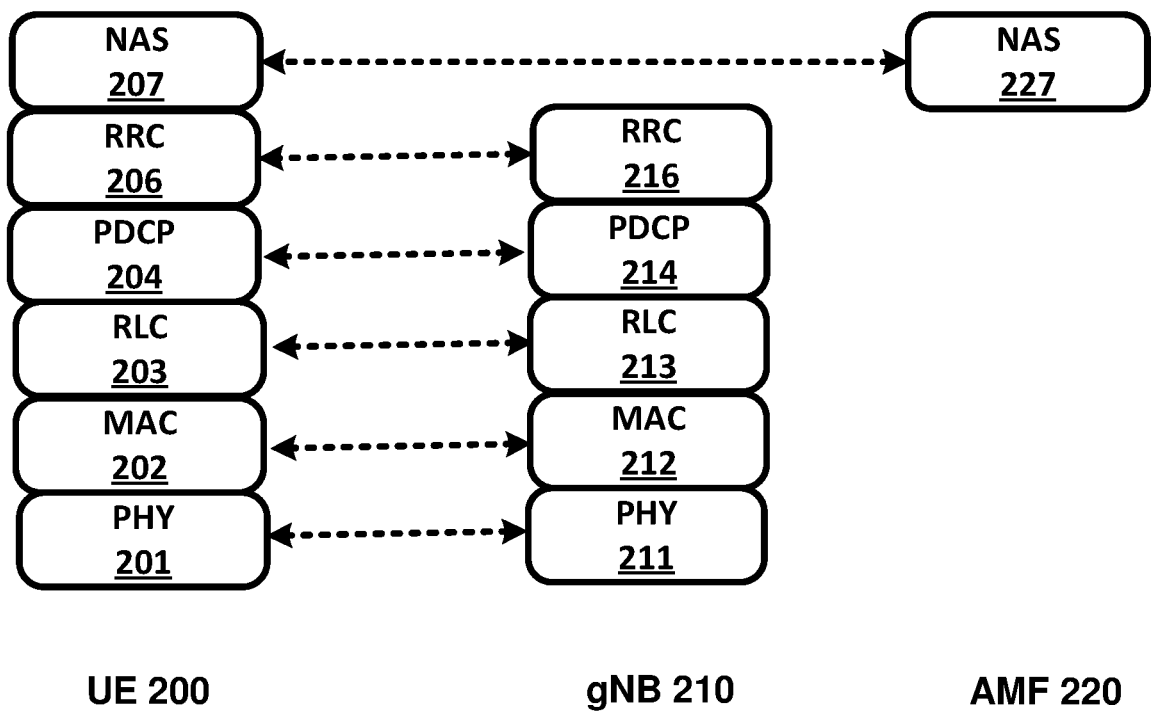

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
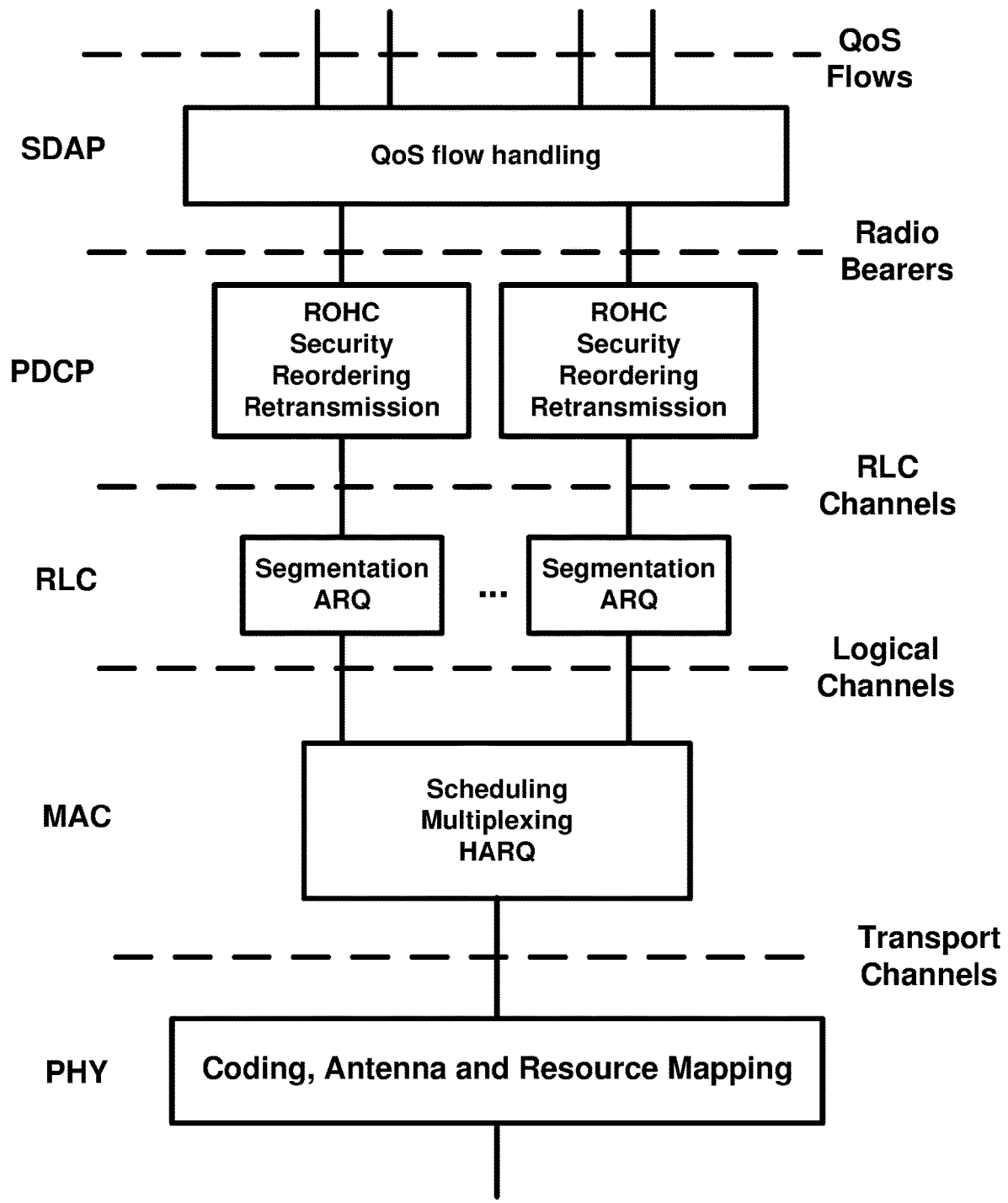
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TB s) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
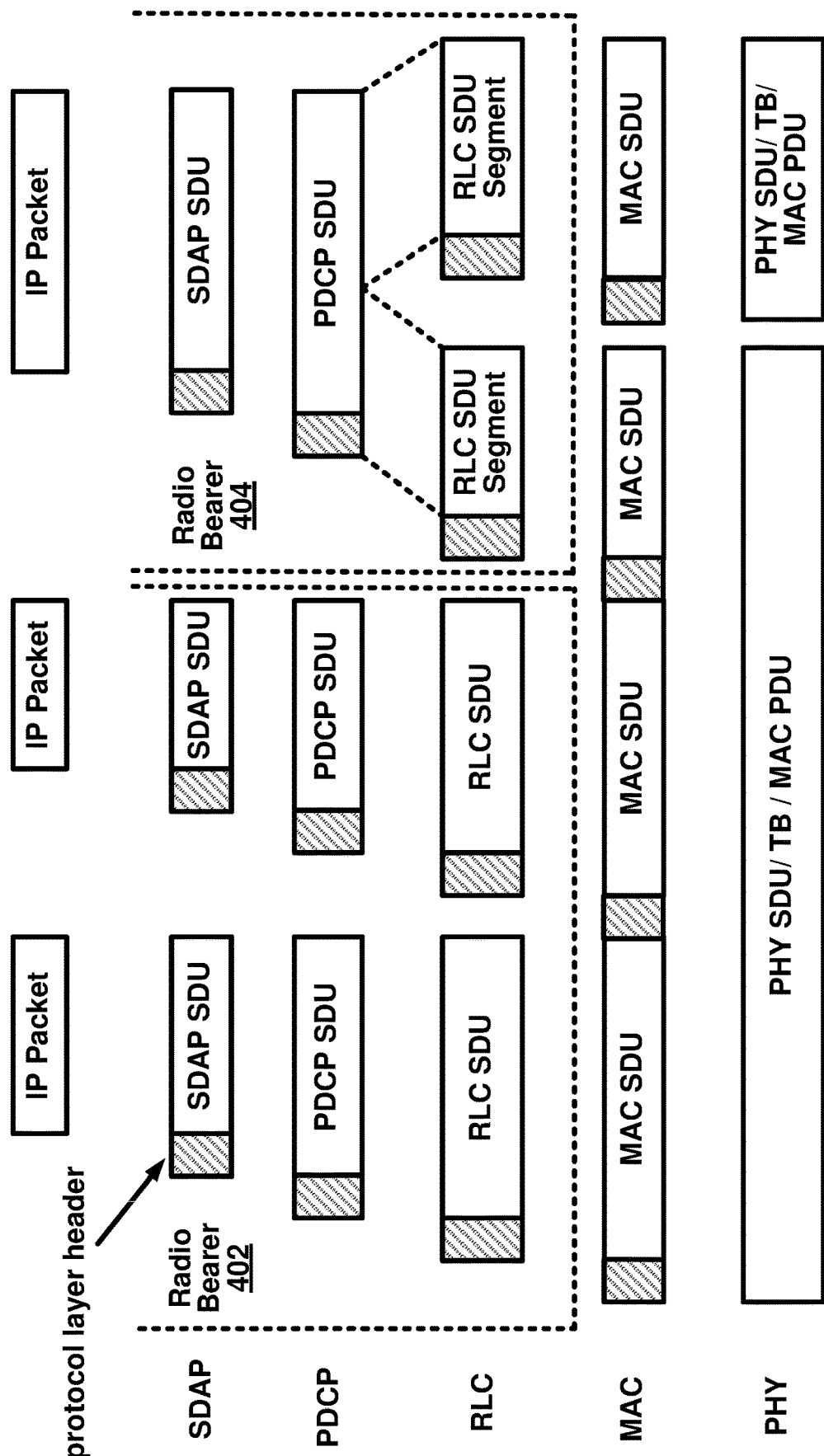
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
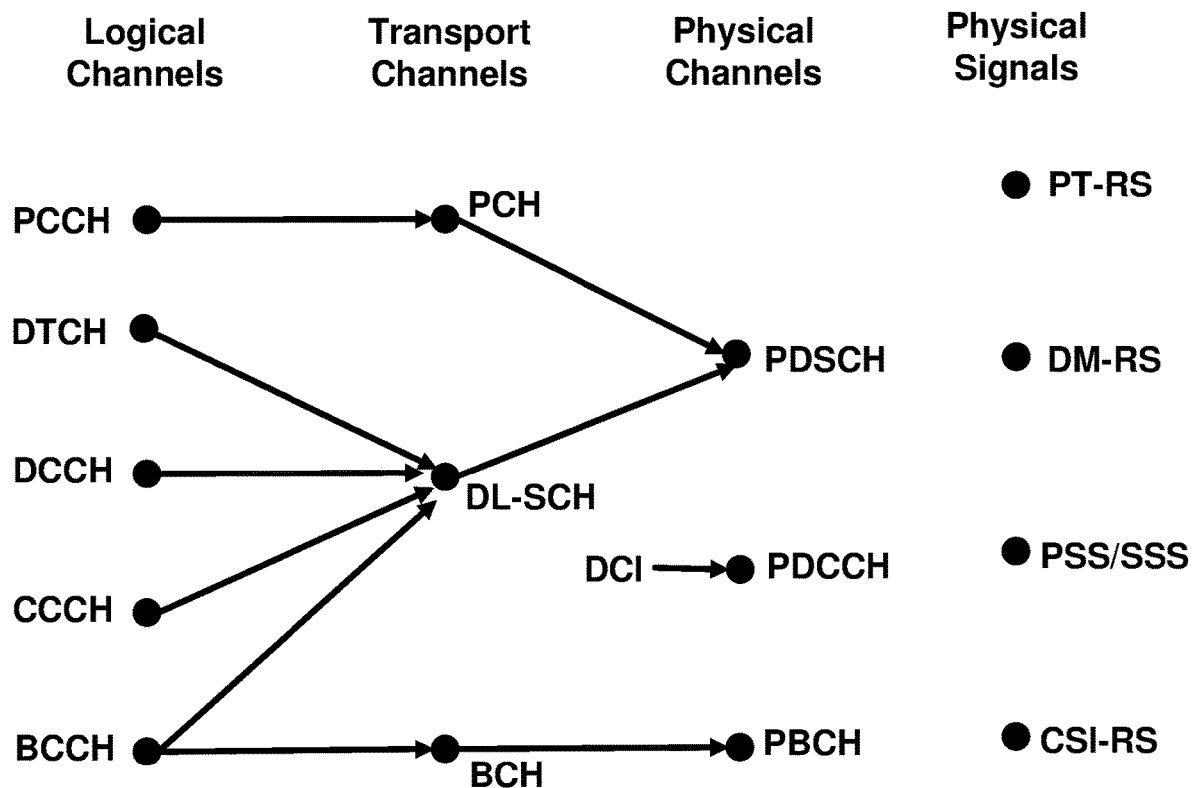
FIG. 5A shows example mapping of channels between layers of the protocol stack and different physical signals in downlink in accordance with several of various embodiments of the present disclosure.
Figure 5B:
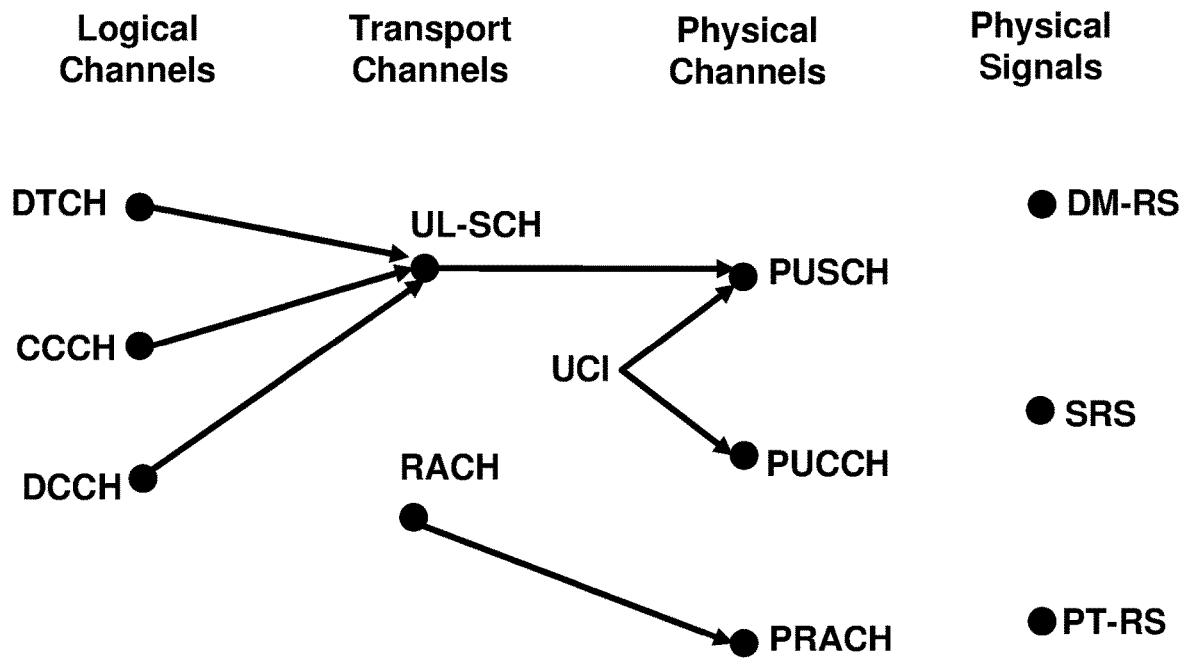
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
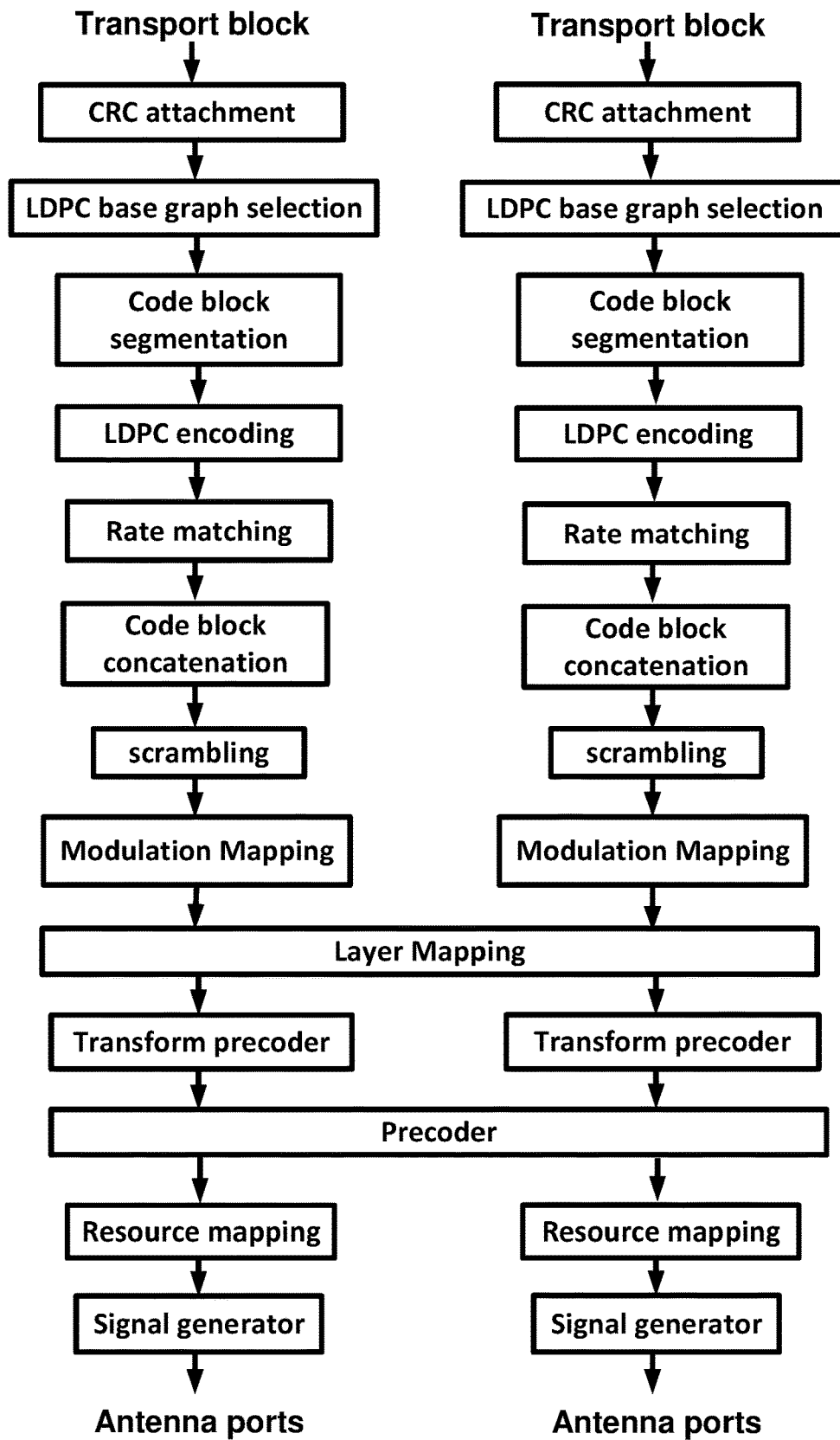
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
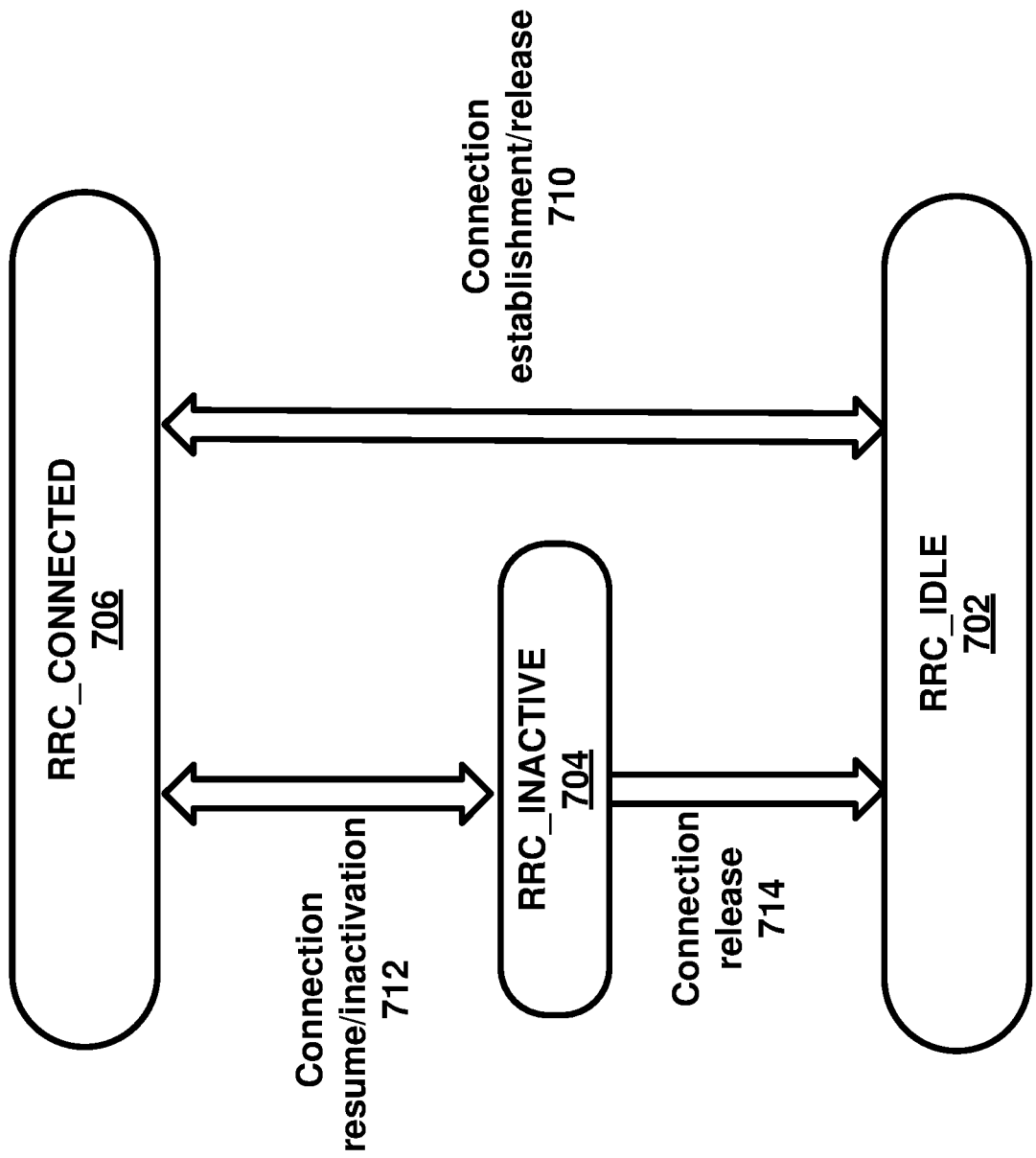
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the μ value).

Figure 8:
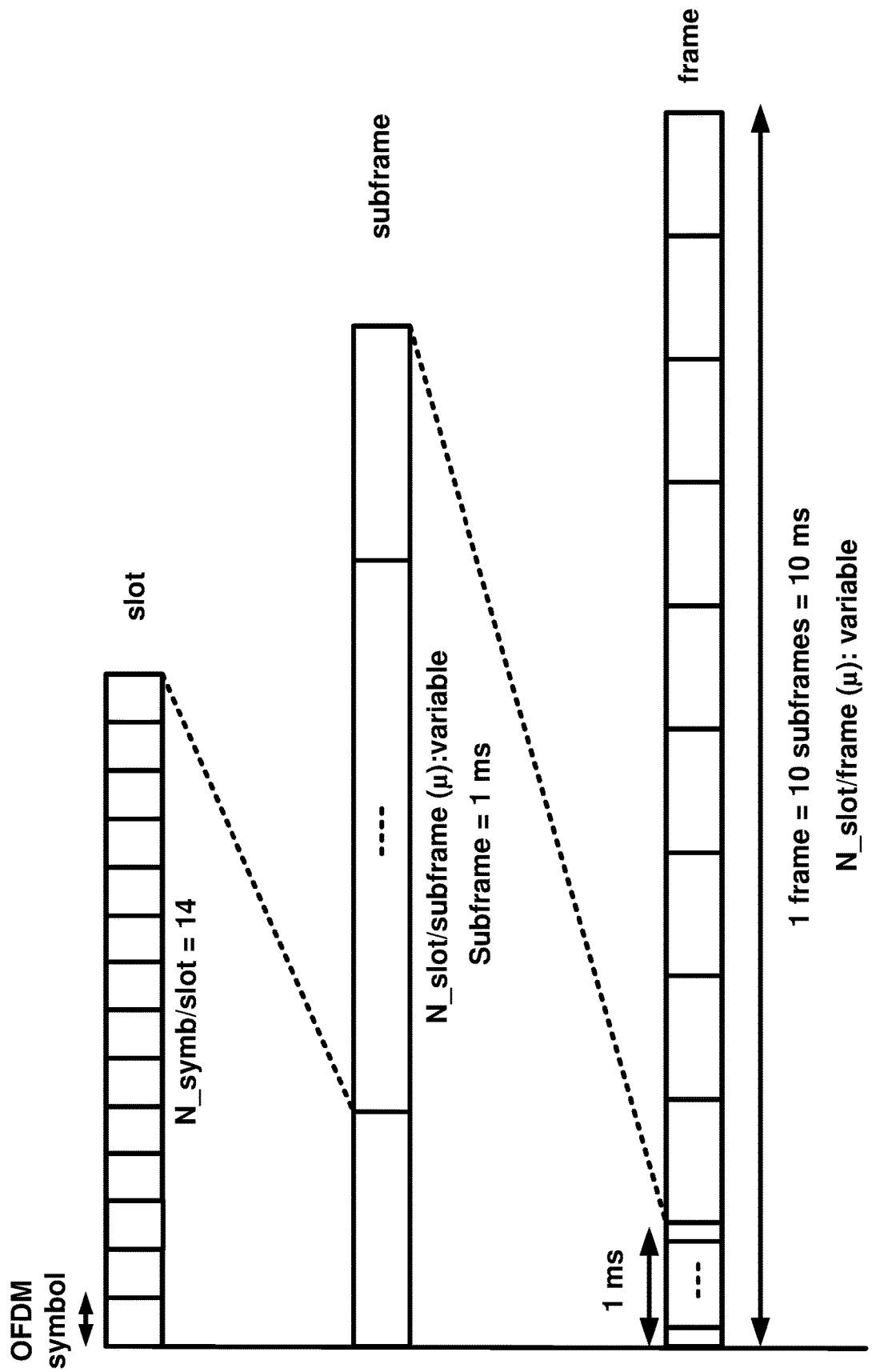
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
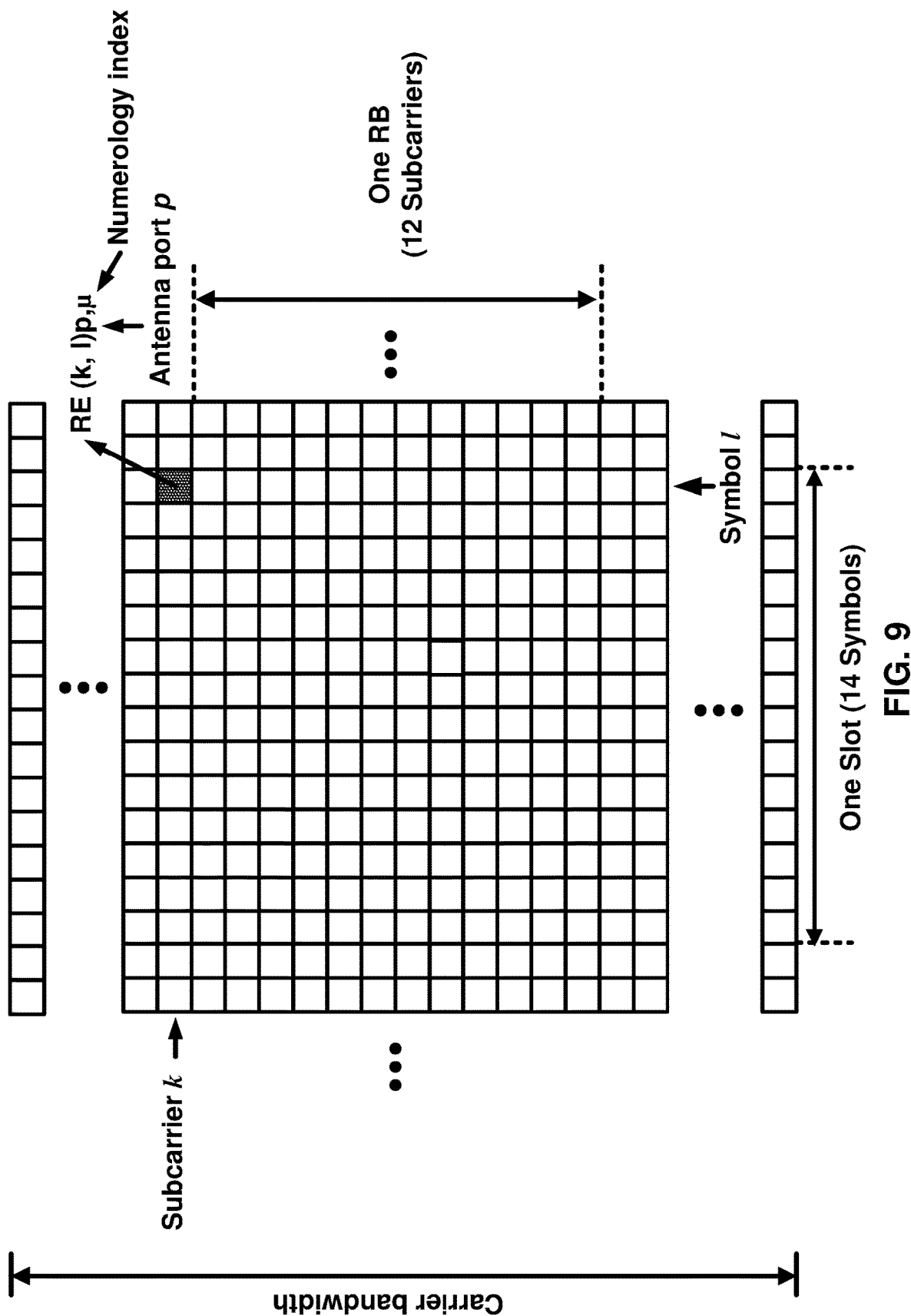
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
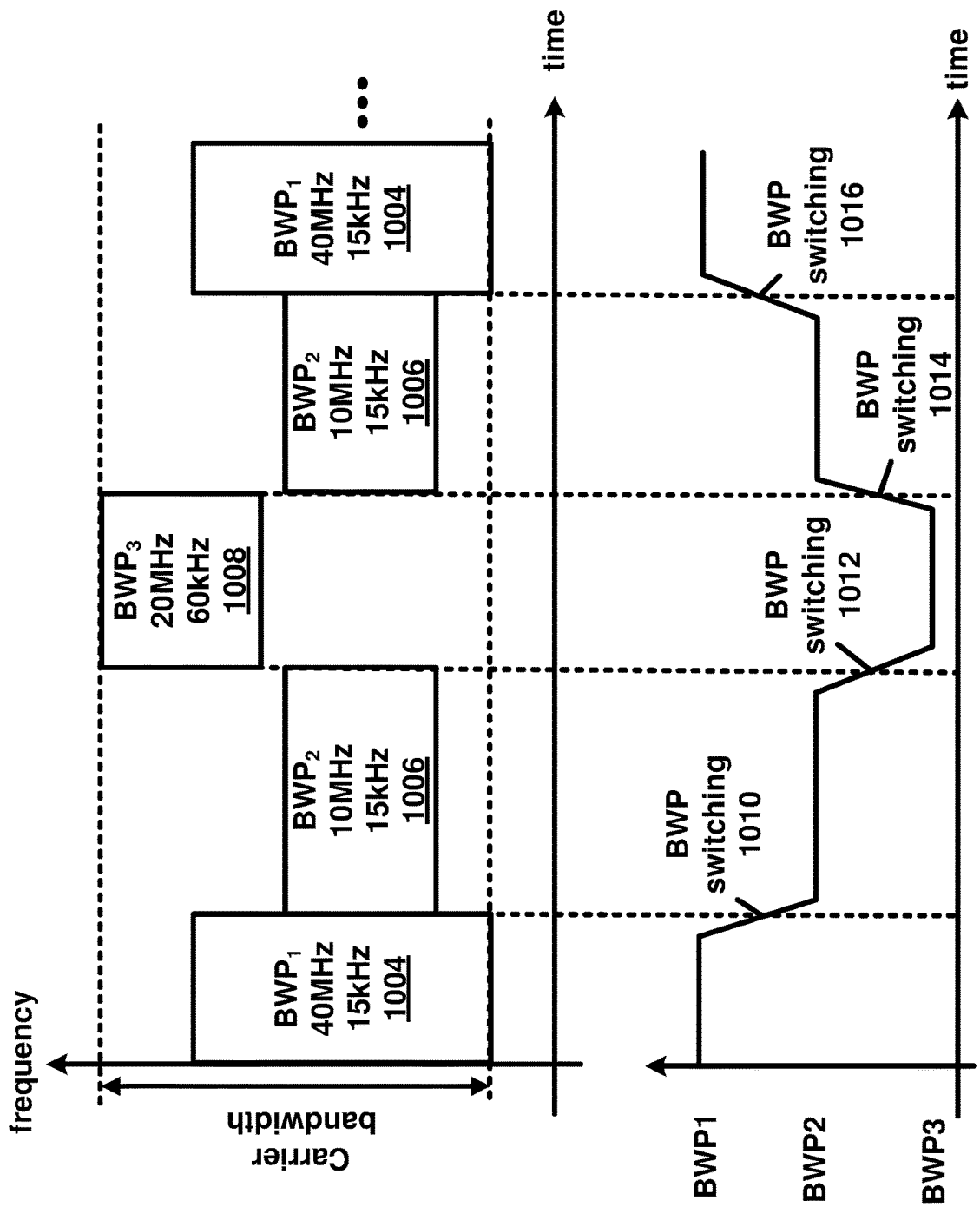
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
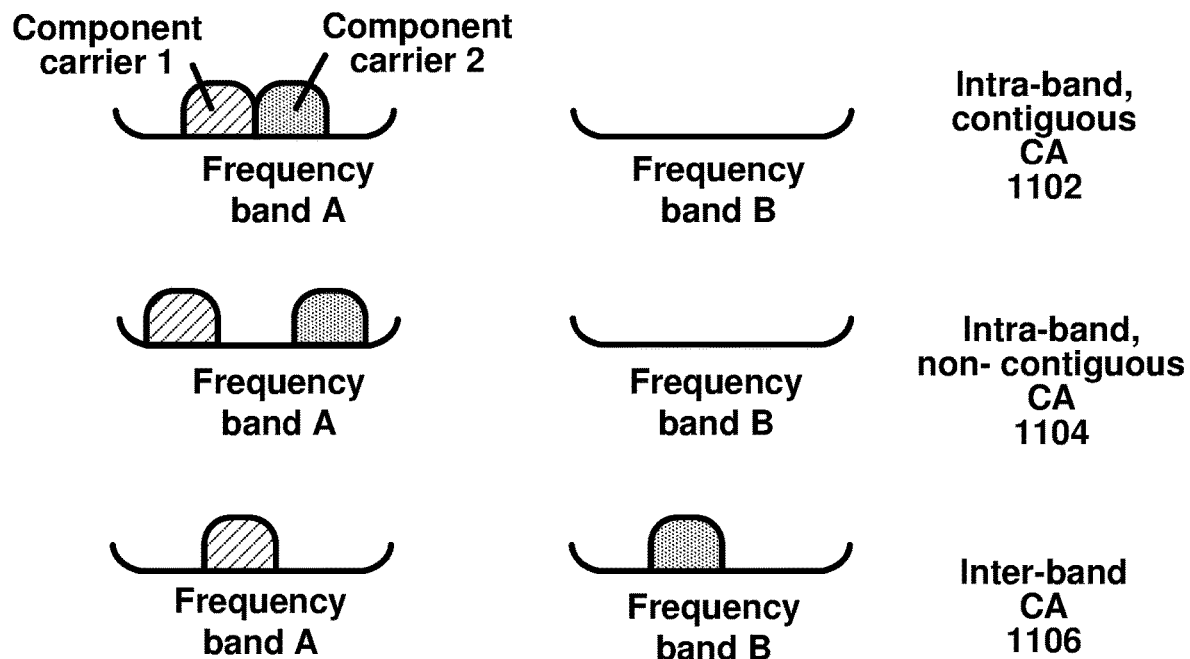
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
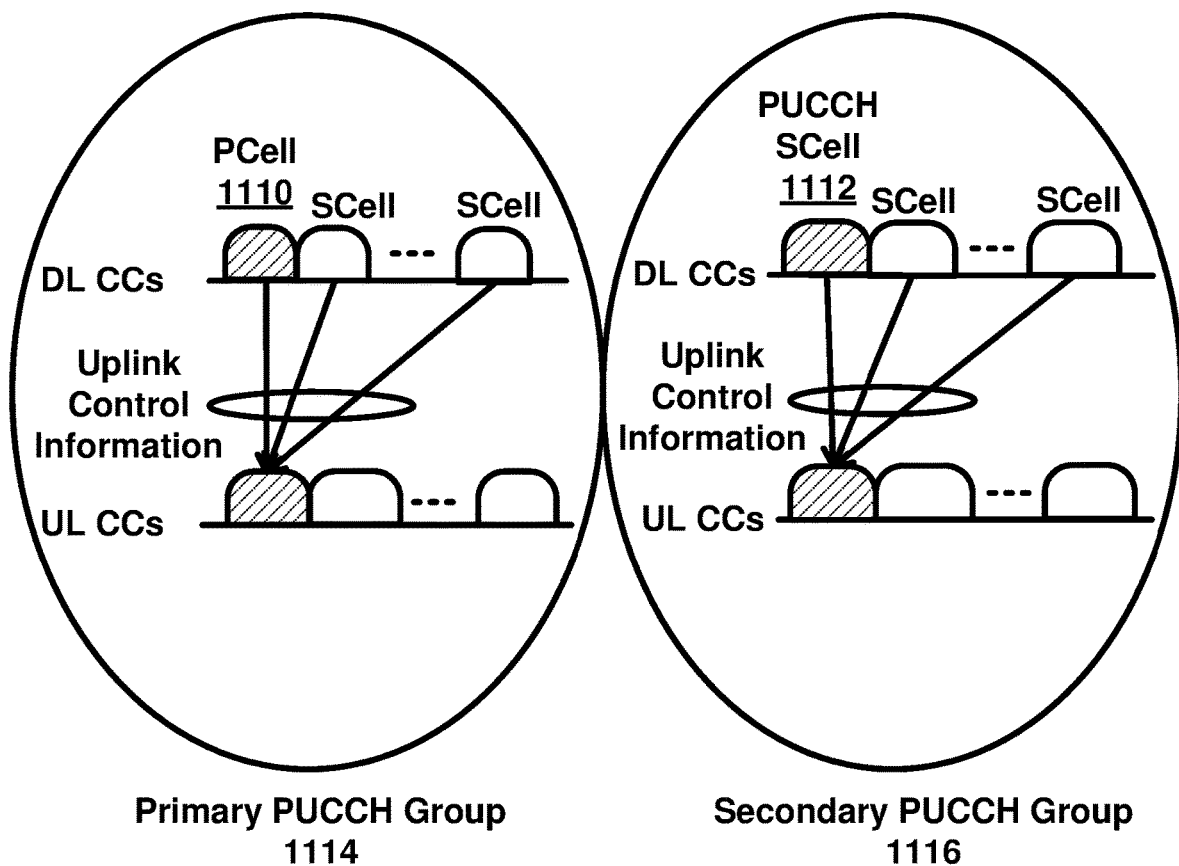
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
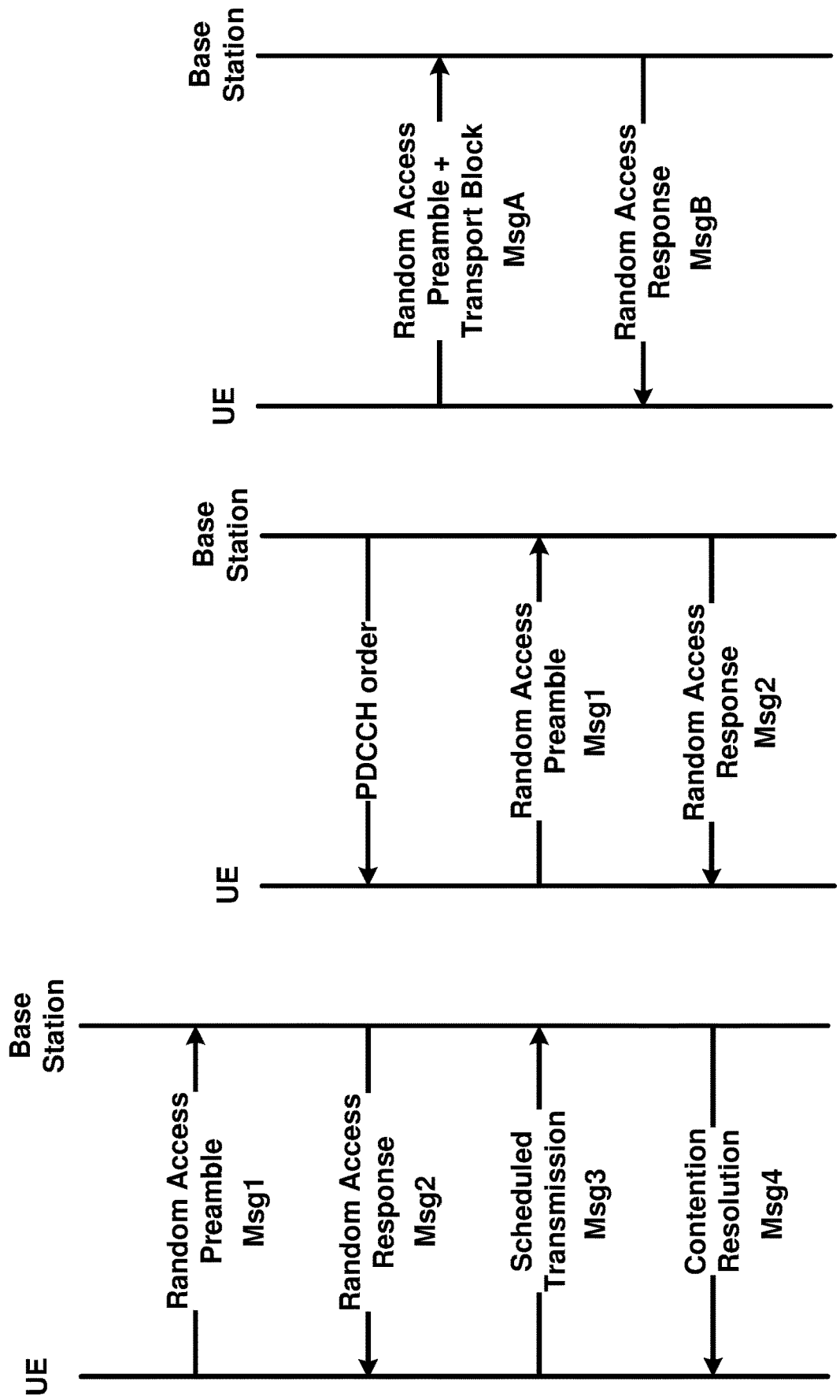
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
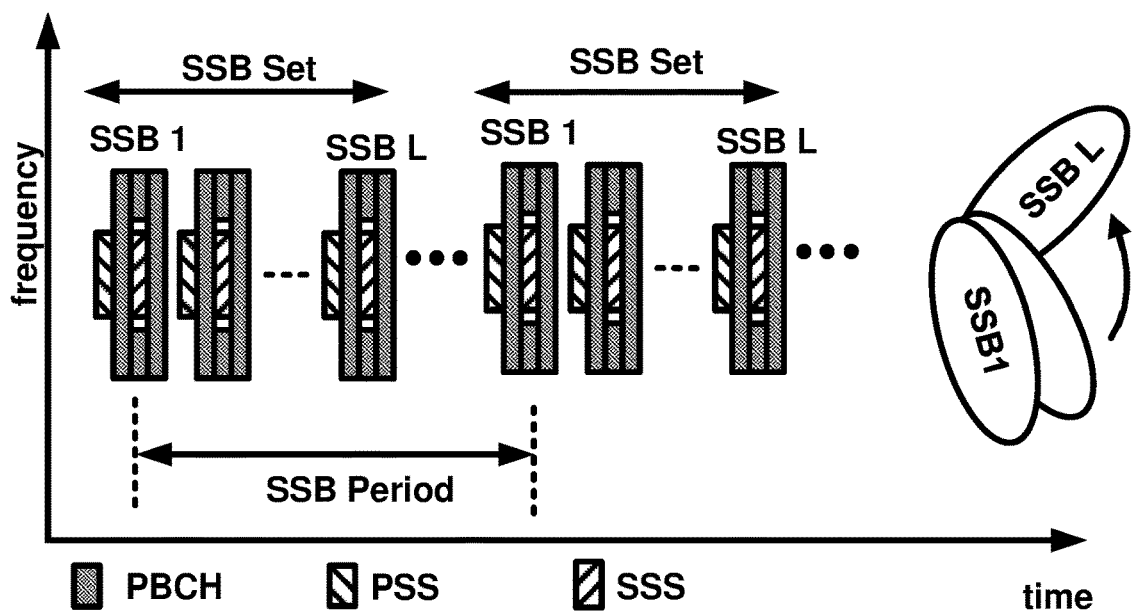
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RS s configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RS s are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH)

that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RS s) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RS s) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RS s of wireless devices scheduled on overlapping frequency domain resources.

Figure 13B:
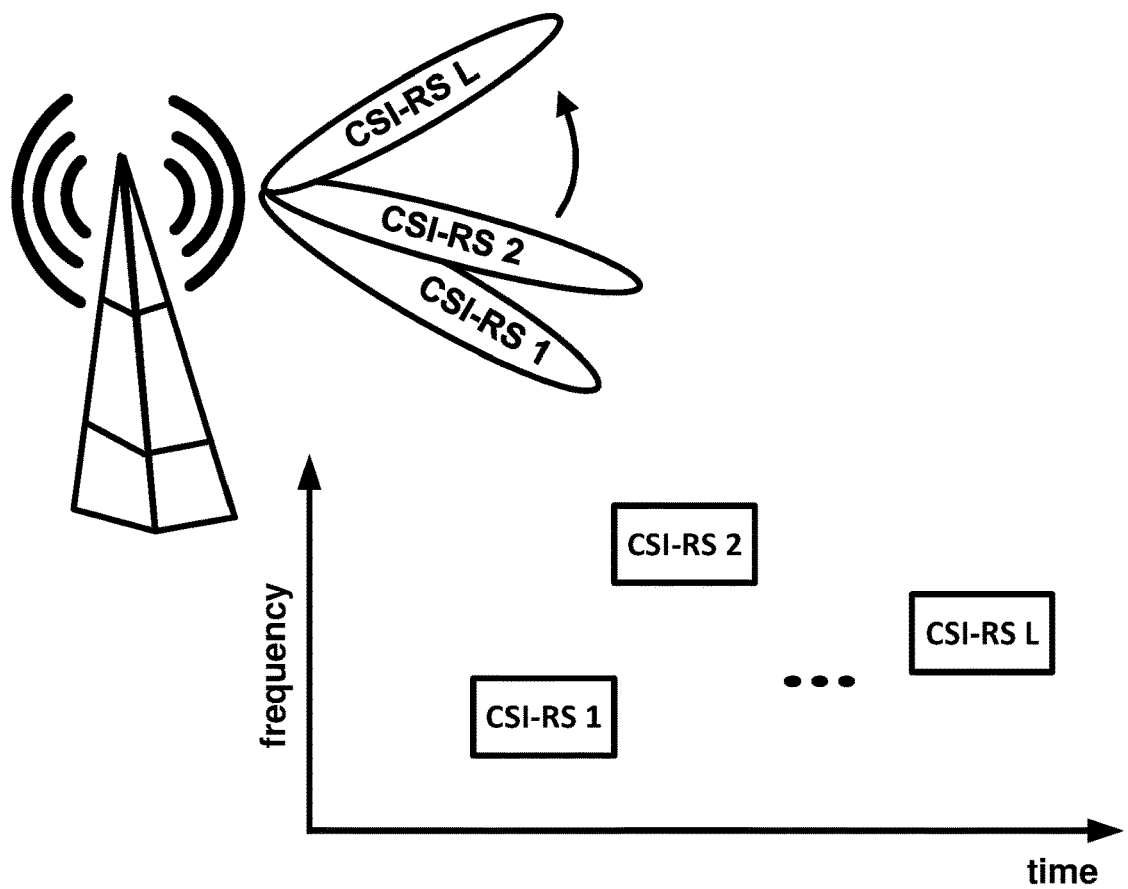
FIG. 13B shows example time and frequency structure of CSI-RSs and their association with beams in accordance with several of various embodiments of the present disclosure.

FIG. 13B shows example time and frequency structure of CSI-RS s and their association with beams in accordance with several of various embodiments of the present disclosure. A beam of the L beams shown in FIG. 13B may be associated with a corresponding CSI-RS resource. The base station may transmit the CSI-RS s using the configured CSI-RS resources and a UE may measure the CSI-RS s (e.g., received signal received power (RSRP) of the CSI-RS s) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
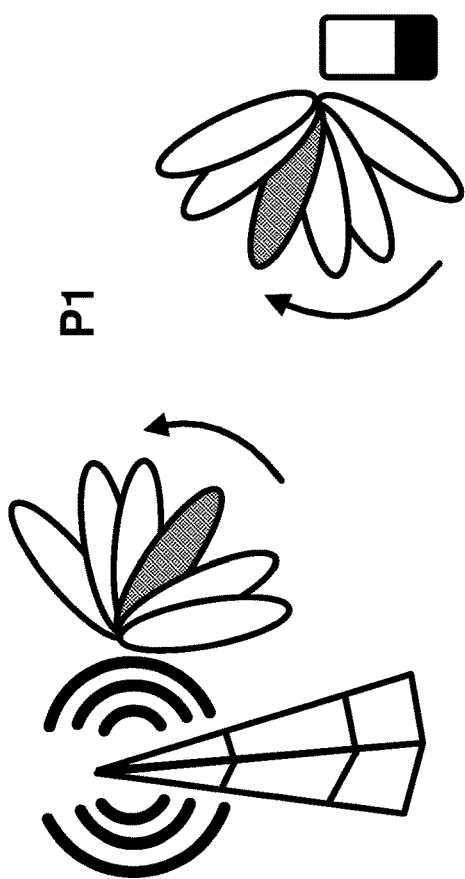
FIG. 14A, FIG. 14B and FIG. 14C show example beam management processes in accordance with several of various embodiments of the present disclosure.
Figure 14C:
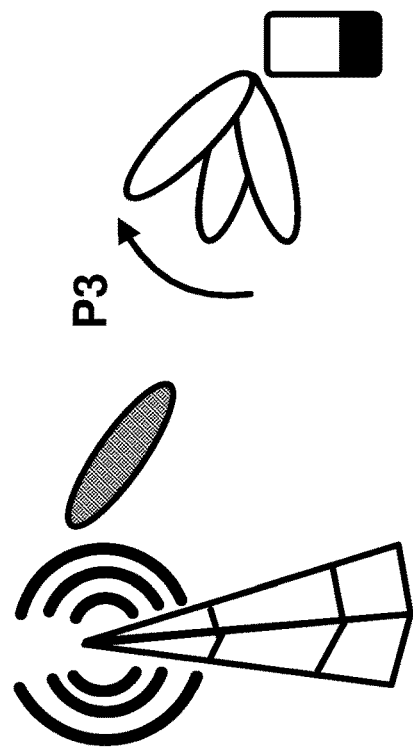
Figure 14B:
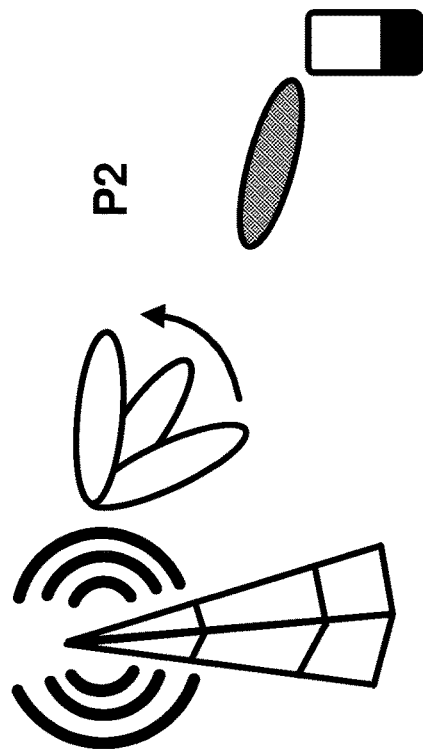

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
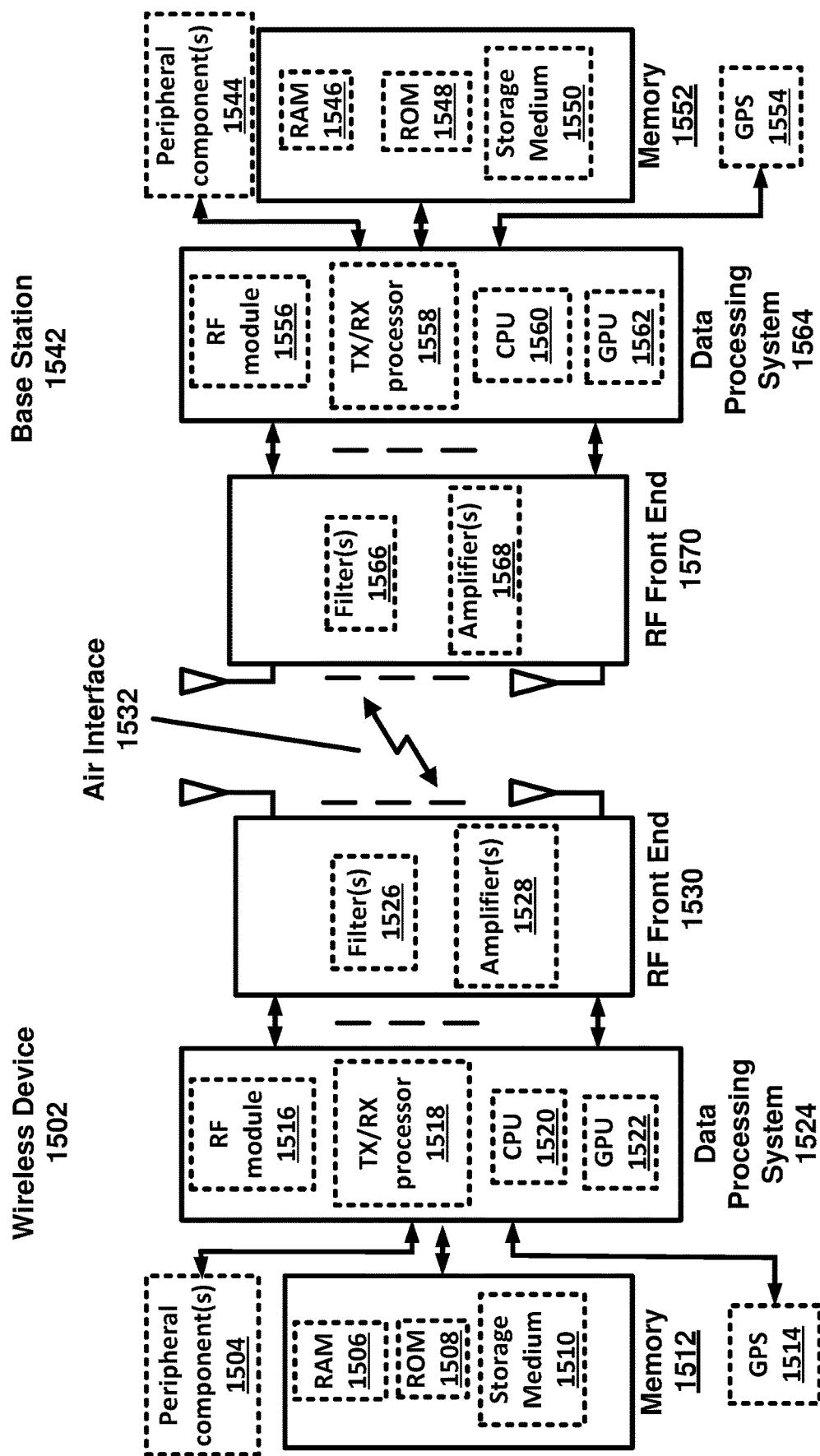
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

Example embodiments may enable mechanism and procedures of L1/L2 based inter-cell mobility, for example for mobility latency reduction. In example embodiments, multiple candidate cells may be configured/pre-configured and the configurations of the multiple candidate cells may be maintained to allow fast application of configurations for candidate cells in response to L1/L2 signaling. In example embodiments, dynamic switch/mobility (e.g., mobility, e.g., inter-cell mobility) mechanisms among candidate serving cells (including SpCell and SCell) based on L1/L2 signaling may be enabled.

In an example, L1/L2 based mobility (e.g., inter-cell mobility) may reduce the user plane data interruption compared with L3 controlled mobility solutions. In an example L1/L2 based mobility solution, candidate cells may be configured/pre-configured. A wireless device may store the configuration and may perform measurement and beam management and the UE may initiate fast cell switching based on L1/L2 signaling.

In an example, network-controlled mobility may apply to UEs in RRC_CONNECTED and may be categorized into two types of mobility: cell level mobility and beam level mobility.

Figure 16:
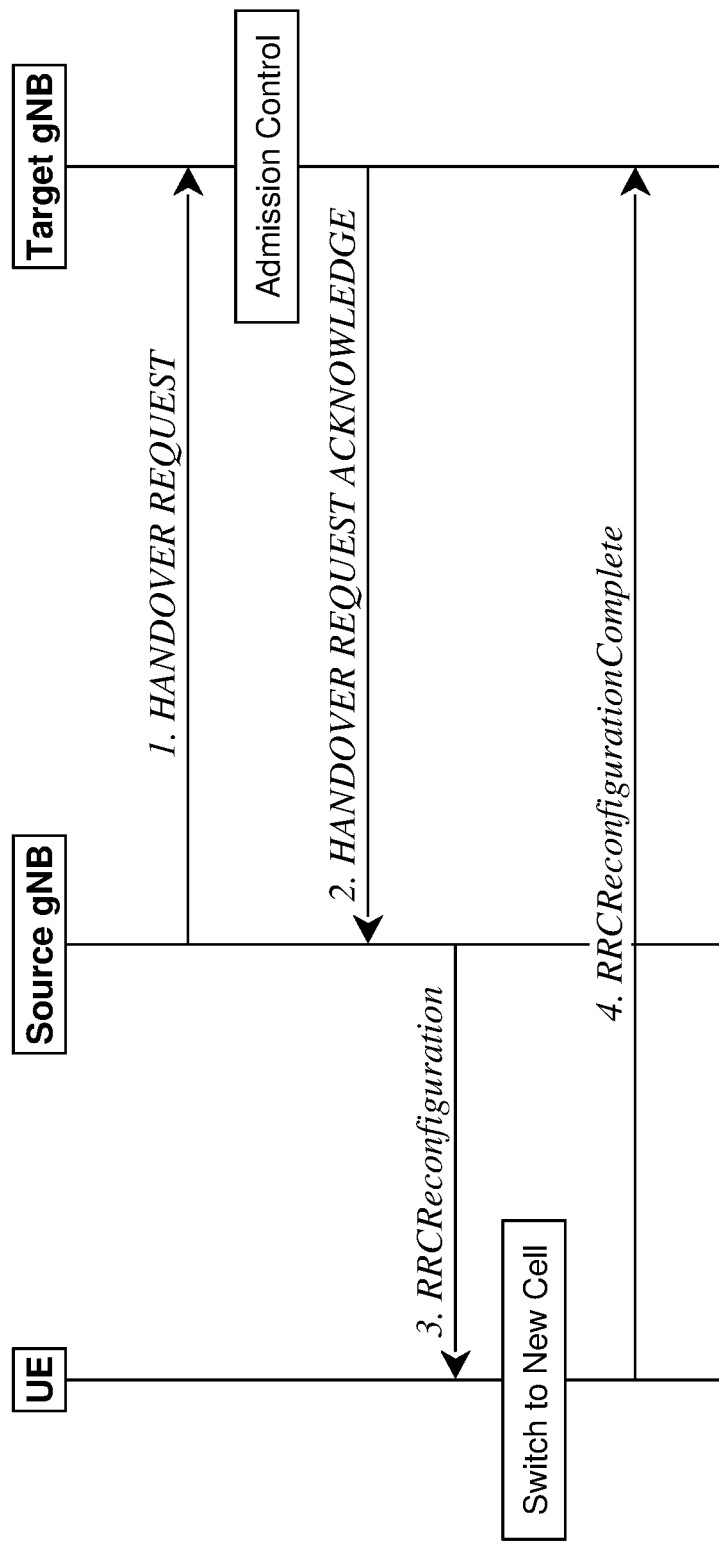
FIG. 16 shows an example handover process in accordance with several of various embodiments of the present disclosure.

In an example, cell level mobility may require explicit RRC signaling to be triggered (e.g., handover). For inter-gNB handover, the signaling procedures may comprise at least the following elemental components illustrated in FIG. 16: the source gNB may initiate handover and may issue a HANDOVER REQUEST over the Xn interface. The target gNB may perform admission control and may provide the new RRC configuration as part of the HANDOVER REQUEST ACKNOWLEDGE. The source gNB may provide the RRC configuration to the UE by forwarding the RRCReconfiguration message received in the HANDOVER REQUEST ACKNOWLEDGE. The RRCReconfiguration message may include at least cell ID and information required to access the target cell so that the UE may access the target cell without reading system information. For some cases, the information required for contention-based and contention-free random access may be included in the RRCReconfiguration message. The access information to the target cell may include beam specific information, if any. The UE may move the RRC connection to the target gNB and may reply with the RRCReconfigurationComplete.

In an example, in case of DAPS handover, the UE may continue the downlink user data reception from the source gNB until releasing the source cell and may continue the uplink user data transmission to the source gNB until successful random access procedure to the target gNB.

In an example, beam level mobility may not require explicit RRC signaling to be triggered. The gNB may provide, via RRC signaling, the UE with measurement configuration containing configurations of SSB/CSI resources and resource sets, reports and trigger states for triggering channel and interference measurements and reports. Beam level mobility may be dealt with at lower layers by means of physical layer and MAC layer control signaling, and RRC may not be required to know which beam is being used at a given point in time.

In an example, SSB-based beam level mobility may be based on the SSB associated to the initial DL BWP and may be configured for the initial DL BWPs and for DL BWPs containing the SSB associated to the initial DL BWP. For other DL BWPs, beam level mobility may be performed based on CSI-RS.

In an example, in RRC_CONNECTED, a wireless device may measure one or more beams (e.g., at least one beam) of a cell and the measurements results (e.g., power values) may be averaged to derive the cell quality. In doing so, the UE may be configured to consider a subset of the detected beams. Filtering may take place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB.

In an example, measurement reports may characterized by the following: measurement reports may include the measurement identity of the associated measurement configuration that triggered the reporting; cell and beam measurement quantities to be included in measurement reports may be configured by the network; the number of non-serving cells to be reported may be limited through configuration by the network; cells belonging to a blacklist configured by the network may not be used in event evaluation and reporting, and conversely when a whitelist is configured by the network, the cells belonging to the whitelist may be used in event evaluation and reporting; beam measurements to be included in measurement reports may be configured by the network (e.g., beam identifier only, measurement result and beam identifier, or no beam reporting).

In an example, intra-frequency neighbor (cell) measurements and inter-frequency neighbor (cell) measurements may be defined as follows. SSB based intra-frequency measurement: a measurement is defined as an SSB based intra-frequency measurement provided the center frequency of the SSB of the serving cell and the center frequency of the SSB of the neighbor cell are the same, and the subcarrier spacing of the two SSBs is also the same; SSB based inter-frequency measurement: a measurement may be defined as an SSB based inter-frequency measurement provided the center frequency of the SSB of the serving cell and the center frequency of the SSB of the neighbor cell may be different, or the subcarrier spacing of the two SSBs may be different. CSI-RS based intra-frequency measurement: a measurement is defined as a CSI-RS based intra-frequency measurement.

In an example, a closed loop Demodulation Reference Signal (DMRS) based spatial multiplexing may be supported for Physical Downlink Shared Channel (PDSCH).

In an example, the DMRS and corresponding PDSCH may be transmitted using the same precoding matrix and the UE may not need to know the precoding matrix to demodulate the transmission. The transmitter may use different precoder matrix for different parts of the transmission bandwidth, resulting in frequency selective precoding. The UE may assume that the same precoding matrix is used across a set of Physical Resource Blocks (PRBs) denoted Precoding Resource Block Group (PRG).

In an example, the UE may assume that at least one symbol with demodulation reference signal is present on each layer in which PDSCH is transmitted to a UE, and up to 3 additional DMRS may be configured by higher layers.

In an example, a closed loop DMRS based spatial multiplexing may be supported for PUSCH. For a given UE, up to 4 layer transmissions may be supported.

In an example, the UE may transmit at least one symbol with demodulation reference signal on each layer on each frequency hop in which the PUSCH is transmitted, and up to 3 additional DMRS may be configured by higher layers.

In an example, a MAC PDU may be a bit string that may be byte aligned (e.g., multiple of 8 bits) in length. In an example, bit strings may be represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU may be represented with the first and most significant bit in the leftmost bit and the last and least significant bit in the rightmost bit. A MAC SDU may be a bit string that may be byte aligned (e.g., multiple of 8 bits) in length. A MAC SDU may be included into a MAC PDU from the first bit onward. In an example, a MAC CE may be a bit string that is byte aligned (e.g., multiple of 8 bits) in length. A MAC subheader may be a bit string that may be byte aligned (e.g., multiple of 8 bits) in length. Each MAC subheader may be placed immediately in front of the corresponding MAC SDU, MAC CE, or padding.

In an example, a MAC PDU may consist of one or more MAC subPDUs. Each MAC subPDU may comprise one of the following: a MAC subheader only (including padding); a MAC subheader and a MAC SDU; a MAC subheader and a MAC CE; a MAC subheader and padding.

In an example, RRC may configure the following parameters for the maintenance of UL time alignment: timeAlignmentTimer (per TAG) which may control how long the MAC entity considers the Serving Cells belonging to the associated TAG to be uplink time aligned.

In an example, when a Timing Advance Command MAC CE is received, and if an NTA has been maintained with the indicated TAG: the MAC entity may apply the Timing Advance Command for the indicated TAG; start or restart the timeAlignmentTimer associated with the indicated TAG.

In an example, when a Timing Advance Command is received in a Random Access Response message for a Serving Cell belonging to a TAG or in a MSGB for an SpCell: if the Random Access Preamble was not selected by the MAC entity among the contention-based Random Access Preamble: the MAC entity may apply the Timing Advance Command for this TAG; start or restart the timeAlignmentTimer associated with this TAG. If the timeAlignmentTimer associated with this TAG is not running: the MAC entity may apply the Timing Advance Command for this TAG; start the timeAlignmentTimer associated with this TAG; when the Contention Resolution is considered not successful or when the Contention Resolution is considered successful for SI request, after transmitting HARQ feedback for MAC PDU including UE Contention Resolution Identity MAC CE: the MAC entity stop timeAlignmentTimer associated with this TAG.

In an example, when an Absolute Timing Advance Command is received in response to a MSGA transmission including C-RNTI MAC CE, the MAC entity may apply the Timing Advance Command for PTAG; start or restart the timeAlignmentTimer associated with PTAG.

In an example, when a timeAlignmentTimer expires: if the timeAlignmentTimer is associated with the PTAG: the MAC entity may flush all HARQ buffers for all Serving Cells; notify RRC to release PUCCH for all Serving Cells, if configured; notify RRC to release SRS for all Serving Cells, if configured; clear any configured downlink assignments and configured uplink grants; clear any PUSCH resource for semi-persistent CSI reporting; consider all running timeAlignmentTimers as expired; maintain NTA of all TAGs.

In an example, when a timeAlignmentTimer expires: if the timeAlignmentTimer is associated with an STAG, then for all Serving Cells belonging to this TAG: the MAC entity may flush all HARQ buffers; notify RRC to release PUCCH, if configured; notify RRC to release SRS, if configured; clear any configured downlink assignments and configured uplink grants; clear any PUSCH resource for semi-persistent CSI reporting; maintain NTA of this TAG.

In an example, when the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity may consider the timeAlignmentTimer associated with the SCell as expired.

In an example, the MAC entity may not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity may not perform any uplink transmission on any Serving Cell except the Random Access Preamble and MSGA transmission on the SpCell.

Figure 17:
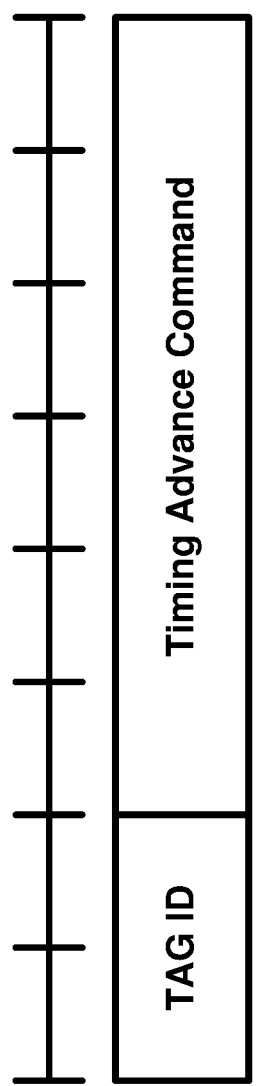
FIG. 17 shows an example medium access control (MAC) control element (CE) in accordance with several of various embodiments of the present disclosure.

In an example, the Timing Advance Command MAC CE may be identified by MAC subheader with an associated LCID. In an example, it may have a fixed size as shown in FIG. 17. In an example, a TAG Identity (TAG ID) field may indicate the TAG Identity of the addressed TAG. The TAG containing the SpCell may have the TAG Identity 0. The length of the field may be 2 bits. A Timing Advance Command field may indicate the index value TA (e.g., 0, 1, 2 . . . 63) used to control the amount of timing adjustment that MAC entity may have to apply.

In an example, a UE may compile and transfers its UE capability information upon receiving a UECapabilityEnquiry from the network.

In an example, the network may initiate a capability transfer procedure to a UE in RRC_CONNECTED when it needs (additional) UE radio access capability information. The network may retrieve UE capabilities after AS security activation.

In an example, the UE may set the contents of UECapabilityInformation message.

In an example, if the ue-CapabilityRAT-RequestList contains a UE-CapabilityRAT-Request with rat-Type set to nr: the UE may include in the ue-CapabilityRAT-ContainerList a UE-CapabilityRAT-Container of the type UE-NR-Capability and with the rat-Type set to nr; may include the supportedBandCombinationList, featureSets and featureSetCombinations.

In an example, if the ue-CapabilityRAT-RequestList contains a UE-CapabilityRAT-Request with rat-Type set to eutra-nr: if the UE supports (NG)EN-DC or NE-DC: the UE may include in the ue-CapabilityRAT-ContainerList a UE-CapabilityRAT-Container of the type UE-MRDC-Capability and with the rat-Type set to eutra-nr; the UE may include the supportedBandCombinationList and featureSetCombinations.

In an example, if the ue-CapabilityRAT-RequestList contains a UE-CapabilityRAT-Request with rat-Type set to eutra: if the UE supports E-UTRA: the UE may include in the ue-CapabilityRAT-ContainerList a ue-CapabilityRAT-Container of the type UE-EUTRA-Capability and with the rat-Type set to eutra, according to the capabilityRequestFilter, if received.

In an example, if the ue-CapabilityRAT-RequestList contains a UE-CapabilityRAT-Request with rat-Type set to utra-fdd: if the UE supports UTRA-FDD: the UE may include the UE radio access capabilities for UTRA-FDD within a ue-CapabilityRAT-Container and with the rat-Type set to utra-fdd.

In an example, if the RRC message segmentation is enabled based on the field rrc-SegAllowed received, and the encoded RRC message is larger than the maximum supported size of a PDCP SDU: the UE may initiate the UL message segment transfer procedure; otherwise the UE may submit the UECapabilityInformation message to lower layers for transmission, upon which the procedure may end.

In an example, the UECapabilityEnquiry message may be used to request UE radio access capabilities for NR as well as for other RATs. In an example, the IE UECapabilityInformation message may be used to transfer UE radio access capabilities requested by the network.

When the UE moves from the coverage area of one cell to another cell, at some point a serving cell change may need to be performed. Existing triggering mechanisms for serving cell change and/or handover/inter-cell mobility may be based on layer 3 (L3) measurements and may be done by RRC signaling triggered reconfiguration with Synchronization for change of PCell and PSCell, as well as release add for SCells when applicable. Existing mechanisms for handover or cell/cell group change/switching may lead to a high latency may involve L2 and/or L1 resets leading to longer latency, larger overhead and longer interruption time than beam switch mobility. There is a need to enhance the existing handover or cell/cell group change/switching mechanisms. Example embodiments enhance the existing handover or cell/cell group change/switching mechanisms.

In example embodiments, a wireless device may receive one or more messages (e.g., one or more RRC messages) comprising configuration parameters. The configuration parameters may comprise first configuration parameters of one or more first cells, second configuration parameters of one or more second cells, and third configuration parameters for measurements (e.g., radio resource management (RRM) measurements to be used for mobility (e.g., handover, e.g., inter-cell handover), cell/cell group switching, etc.)). The wireless device may receive the one or more messages from a first base station (BS). The one or more first cells may be associated with/of/provided by the first BS. In an example, the one or more second cells may be associated with/of/ provided by the first BS. In an example, the one or more second cells may be provided by a second BS.

In example embodiments, the handover or cell/cell group switching may comprise changing from one or more first cells to one or more second cells. For example, in case of handover, the wireless device may change from one or more first cells of a first BS to one or more second cells of a second BS. For example, the changing from the one or more first cells to the one or more second cells may comprise changing SpCell (e.g., PCell or PSCell), changing a cell group (e.g., secondary cell group (SCG) change), changing secondary cell (SCell), etc.

In example embodiments, the third configuration parameters may comprise signals configuration parameters (e.g., reference signal configuration parameters) of signals (e.g., reference signals) associated with/transmitted via the one or more second cells. The wireless device may perform measurements for the one or more second cells and/or for the beams associated with the one or more second cells based on the third configuration parameters (e.g., based on measuring the signals/reference signals associated with/transmitted via the one or more second cells and/or measuring the signals/ reference signals corresponding to the beams associated with the one or more second cells).

Figure 18:
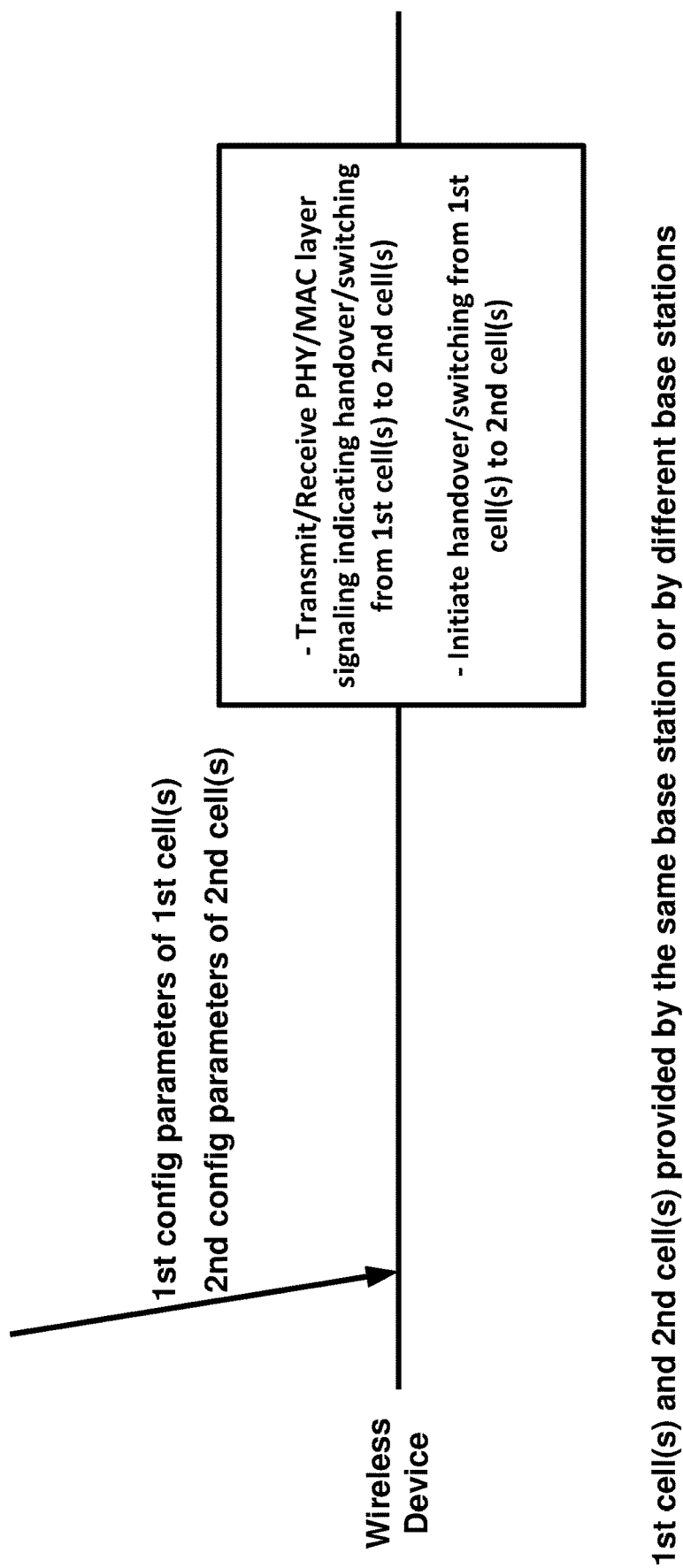
FIG. 18 shows an example process in accordance with several of various embodiments of the present disclosure.

In an example embodiment as shown in FIG. 18, physical layer signaling (e.g., control information transmitted using control channel or physical layer signal(s)) and/or MAC layer signaling (e.g., MAC CE(s)) may be used to indicate handover from the one or more first cells to the one or more second cells or may be used to indicate switching from the one or more first cells to the one or more second cells (e.g., a cell group change/switch, a change/switch of SpCell (e.g., PCell/PSCell) a change of SCell, etc.). In an example, the physical layer signaling and/or the MAC layer signaling may be transmitted/received based on/in response to the measurement results of the measurements performed using the third configuration parameters. In response to the physical layer and/or the MAC layer signaling, the wireless device may initiate handover from the one or more first cells to the one or more second cells or may initiate switching from the one or more first cells to the one or more second cells.

Figure 19:
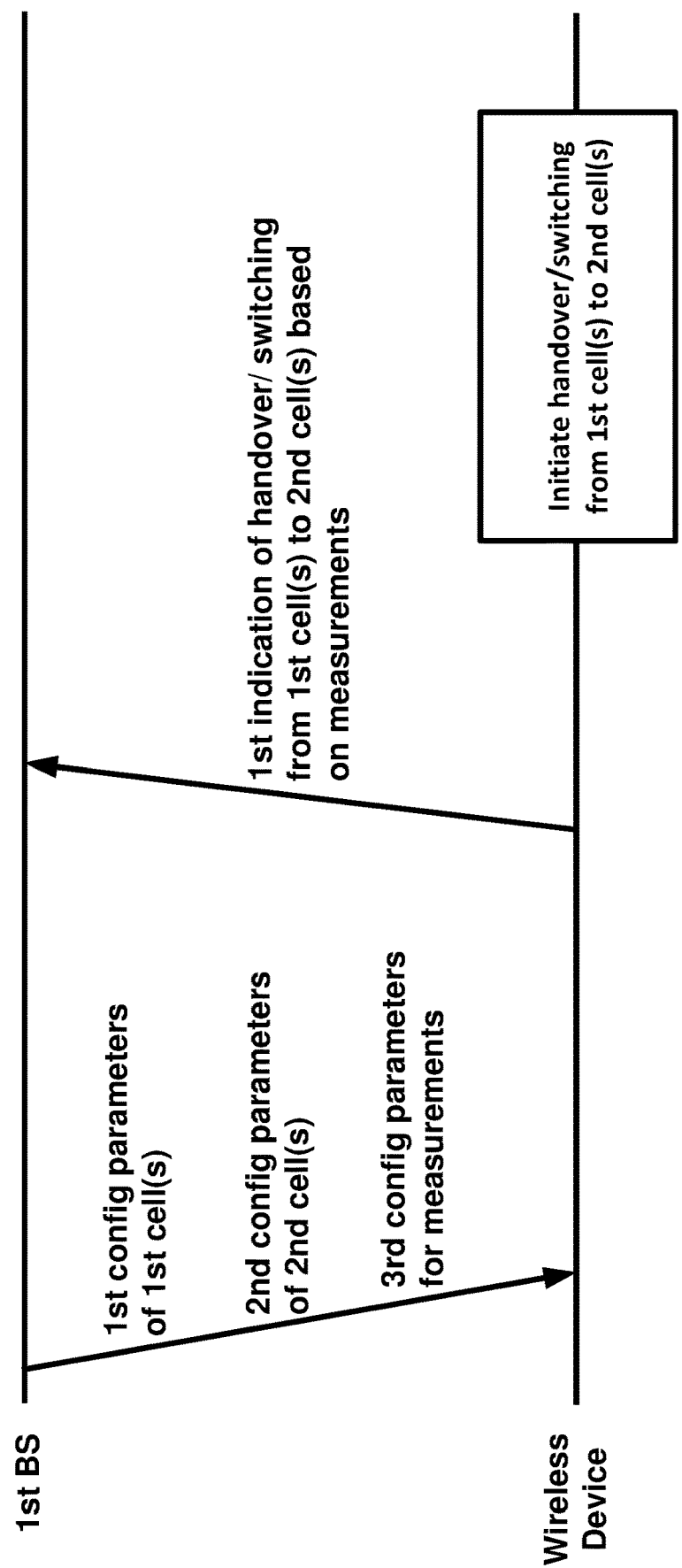
FIG. 19 shows an example process in accordance with several of various embodiments of the present disclosure.
Figure 20:
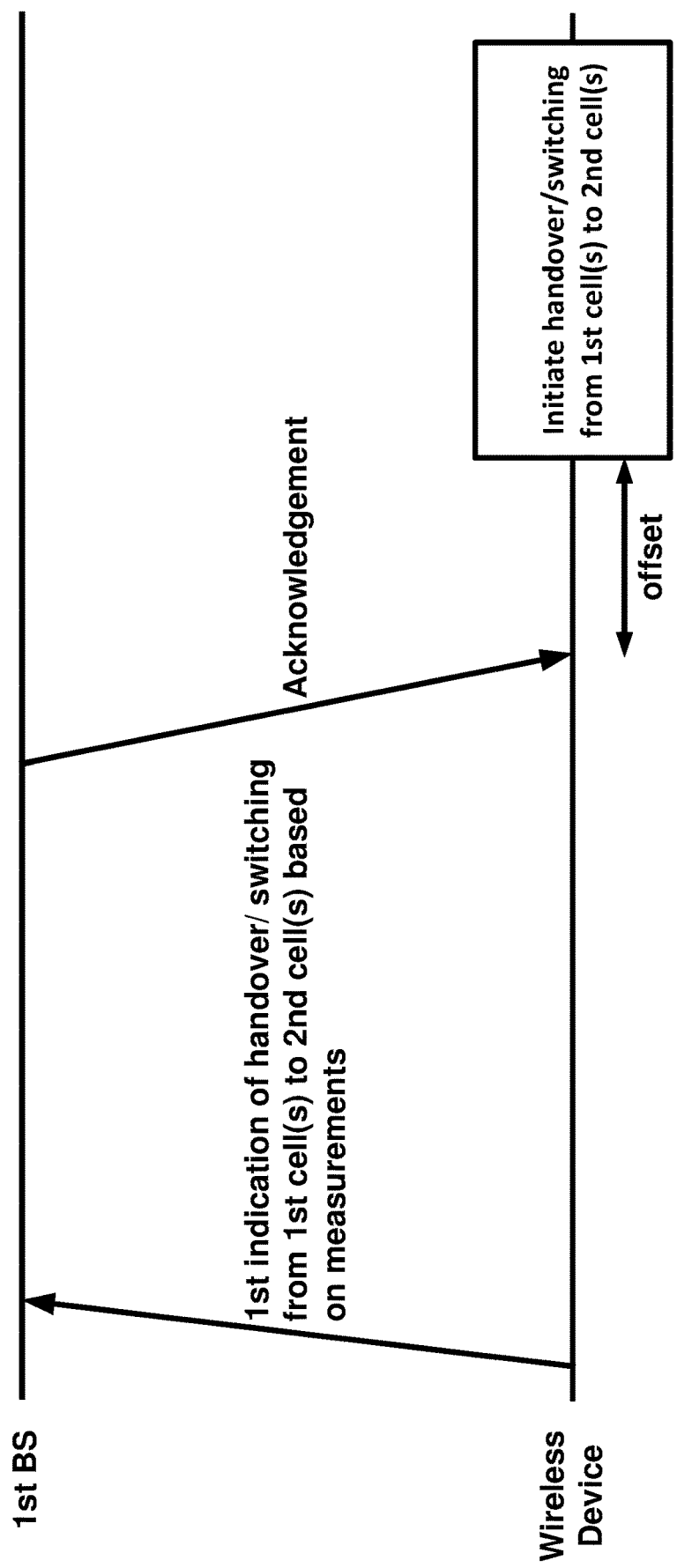
FIG. 20 shows an example process in accordance with several of various embodiments of the present disclosure.
Figure 21:
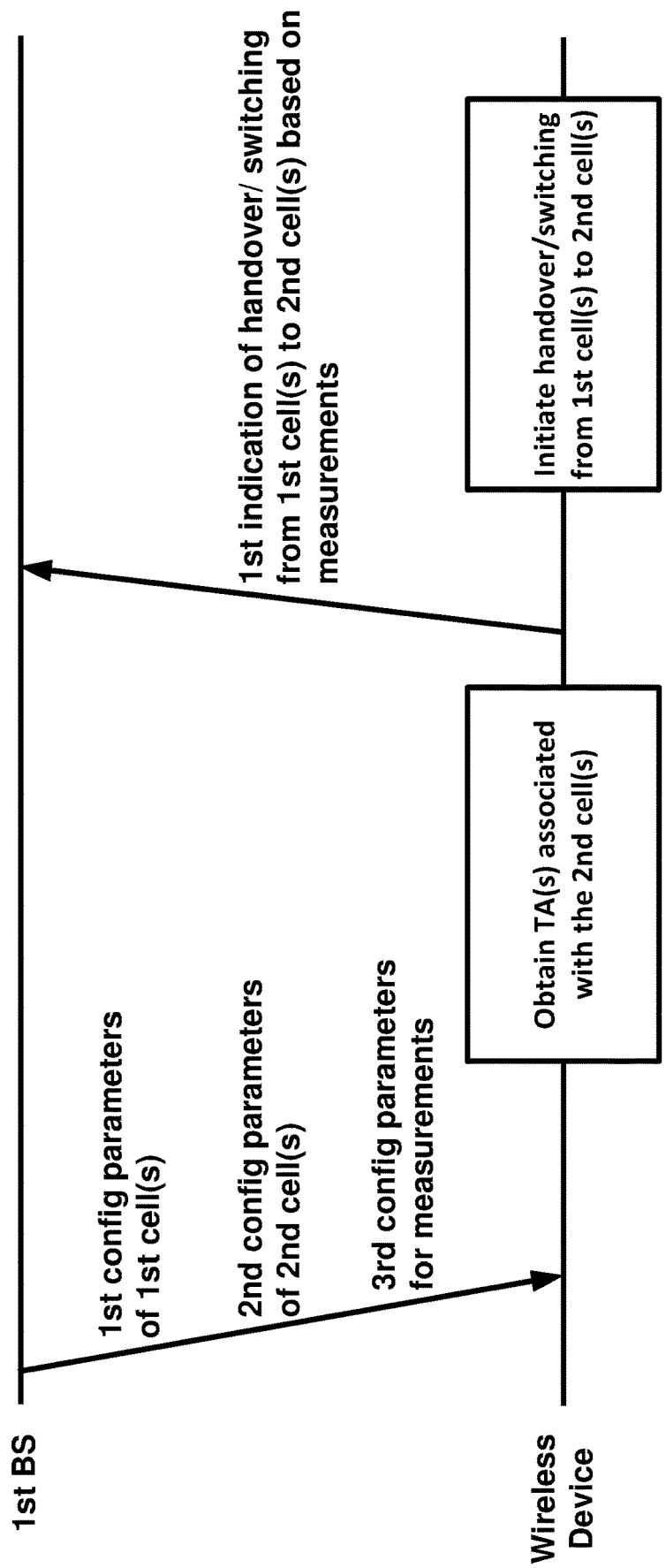
FIG. 21 shows an example process in accordance with several of various embodiments of the present disclosure.

In example embodiments as shown in FIG. 19, FIG. 20 and FIG. 21, the wireless device may transmit a first indication of handover/switching from the one or more first cells to the one or more second cells. In an example, the wireless device may make a determination of handover/ switching from the one or more first cells to the one or more second cells and may transmit the first indication that the wireless device has made the determination. In an example, the wireless device may make a selectin of the one or more second cells for handover/switching from the one or more first cells to the one or more second cells and may transmit the first indication that the wireless device has made the selection.

In an example, the first indication may be via physical layer signaling or may be via MAC layer signaling.

In an example, in case the first indication is via physical layer signaling, the physical layer signaling may be via uplink control information (e.g., UCI to be transmitted via an uplink control channel or to be multiplexed via PUSCH) or via an uplink signal (e.g., via an uplink reference signal such as SRS, DMRS, etc.). In an example, the first indication may be via a scheduling request (SR) associated with a first SR configuration. In an example a sequence associated with the uplink signal (e.g., a sequence (e.g., a sequence number) associated with uplink signal, e.g., SRS or DMRS) may be used for the first indication. The wireless device may receive configuration parameters for transmission of (e.g., for determining radio resources for transmission of) the first indication via the uplink control channel (e.g., for transmission of the UCI or configuration parameters of the first SR configuration associated with the first indication) or based on the uplink signal. In case the first indication is based multiplexing UCI via PUSCH, the wireless device may receive an uplink grant indicating radio resources for transmission of a transport block via PUSCH and transmission of the UCI may be via first radio resources of the radio resources indicated by the uplink grant.

In an example, in case the first indication is MAC layer signaling, the MAC layer signaling for transmission of the first indication may be via a first MAC CE (e.g., an uplink MAC CE). In an example, the first MAC CE may have a first format associated with L1/L2 based handover/switching. In an example, the first MAC CE may be associated with a first LCID that is associated with the L1/L2 based handover/ switching. The first MAC CE may be multiplexed in a transport block and the wireless device may transmit the transport block based on/via an uplink shared/data channel.

In an example, the one or more first cells may be associated with/of/provided by the first BS and the one or more second cells may be associated with/of/provided by the second BS. The first indication, transmitted by the wireless device, may indicate the handover from the one or more first cells of the first BS to the one or more second cells of the second BS. In response to transmitting the first indication, the wireless device may initiate the handover from the one or more first cells of the first BS to the one or more second cells of the second BS. In an example, the wireless device may initiate the handover based on second configuration parameters of the one or more second cells (e.g., received prior to the indication).

In an example embodiment as shown in FIG. 20, the wireless device may receive a first acknowledgement in response to transmission of the first indication indicating successful reception (e.g., by the first BS) of the first indication. The wireless device may initiate the handover from the one or more first cells of the first BS to the one or more second cells of the second BS in response to reception of the first acknowledgement. For example, the wireless device may initiate the handover on/after an offset from a first timing of reception of the first acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be a HARQ acknowledgement. For example, in case the first indication is via a MAC CE multiplexed in a transport block, the first acknowledgement may indicate successful reception of the transport block (e.g., by the first BS). The wireless device may initiate the handover from the one or more first cells of the first BS to the one or more second cells of the second BS in response to reception of the first HARQ acknowledgement. For example, the wireless device may initiate the handover on/after an offset from a first timing of reception of the first HARQ acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be via a second MAC CE. For example, the second MAC CE may have a zero payload and an LCID associated with the second MAC CE may indicate that the second MAC CE is for an acknowledgement of the first indication. The wireless device may initiate the handover from the one or more first cells of the first BS to the one or more second cells of the second BS in response to reception of the second MAC CE. For example, the wireless device may initiate the handover on/after an offset from a first timing of reception of the second MAC CE. In an example, the offset may be in a number of symbols or in a number of slots. In an example, the offset may be pre-configured. In an example, the offset may be configurable, and the wireless device may receive a configuration parameter indicating the offset.

In an example, the initiating the handover from the one or more first cells of the first BS to the one or more second cells of the second BS may comprise initiating one or more random access processes comprising transmitting one or more random access preambles via the one or more second cells. The initiating the one or more random access processes may be based on second configurations parameters of the one or more second cells (e.g., random access configuration parameters indicating random access occasions/parameters).

In an example, in response to transmission of the first indication, the wireless device may communicate via the one or more second cells (e.g., may transmit uplink signals/channels or may receive downlink signals/channels via the one or more second cells). In an example, in response to transmission of the first indication, the wireless device may switch from the one or more first cells to the one or more second cells. The communication via the one or more second cells and/or switching to the one or more second cells may be based on the second configuration parameters of the one or more second cells.

In an example embodiment as shown in FIG. 20, the wireless device may receive a first acknowledgement in response to transmission of the first indication indicating successful reception (e.g., by the first BS) of the first indication. The wireless device may communicate via the one or more second cells and/or switch from the one or more first cells to the one or more second cells in response to reception of the first acknowledgement. For example, the wireless device may communicate via the one or more second cells and/or switch from the one or more first cells to the one or more second cells on/after an offset from a first timing of reception of the first acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be a HARQ acknowledgement. For example, in case the first indication is via a MAC CE multiplexed in a transport block, the first acknowledgement may indicate successful reception of the transport block (e.g., by the first BS). The wireless device may communicate via the one or more second cells and/or switch from the one or more first cells to the one or more second cells in response to reception of the first HARQ acknowledgement. For example, the wireless device may communicate via the one or more second cells and/or switch from the one or more first cells to the one or more second cells on/after an offset from a first timing of reception of the first HARQ acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be via a second MAC CE. For example, the second MAC CE may have a zero payload and an LCID associated with the second MAC CE may indicate that the second MAC CE is for an acknowledgement of the first indication. The wireless device may communicate via the one or more second cells and/or switch from the one or more first cells to the one or more second cells in response to reception of the second MAC CE. For example, the wireless device may initiate the handover on/after an offset from a first timing of reception of the second MAC CE. In an example, the offset may be in a number of symbols or in a number of slots. In an example, the offset may be pre-configured. In an example, the offset may be configurable, and the wireless device may receive a configuration parameter indicating the offset.

In an example embodiment, the wireless device may receive a second indication from the first base station in response to transmitting the first indication. The second indication may indicate one or more third cells of the one or more second cells. The one or more third cells may be a subset of the one or more second cells and the base station may determine/select the one or more third cells from the one or more second cells based on some criteria such as channel conditions of the one or more third cells, etc. In an example, the second indication may be based on a DCI transmitted via an uplink control channel. In an example, the second indication may be via a MAC CE. In an example, the wireless device may transmit an acknowledgement (e.g., a HARQ acknowledgement or a MAC CE) in response to receiving the second indication.

Figure 31:
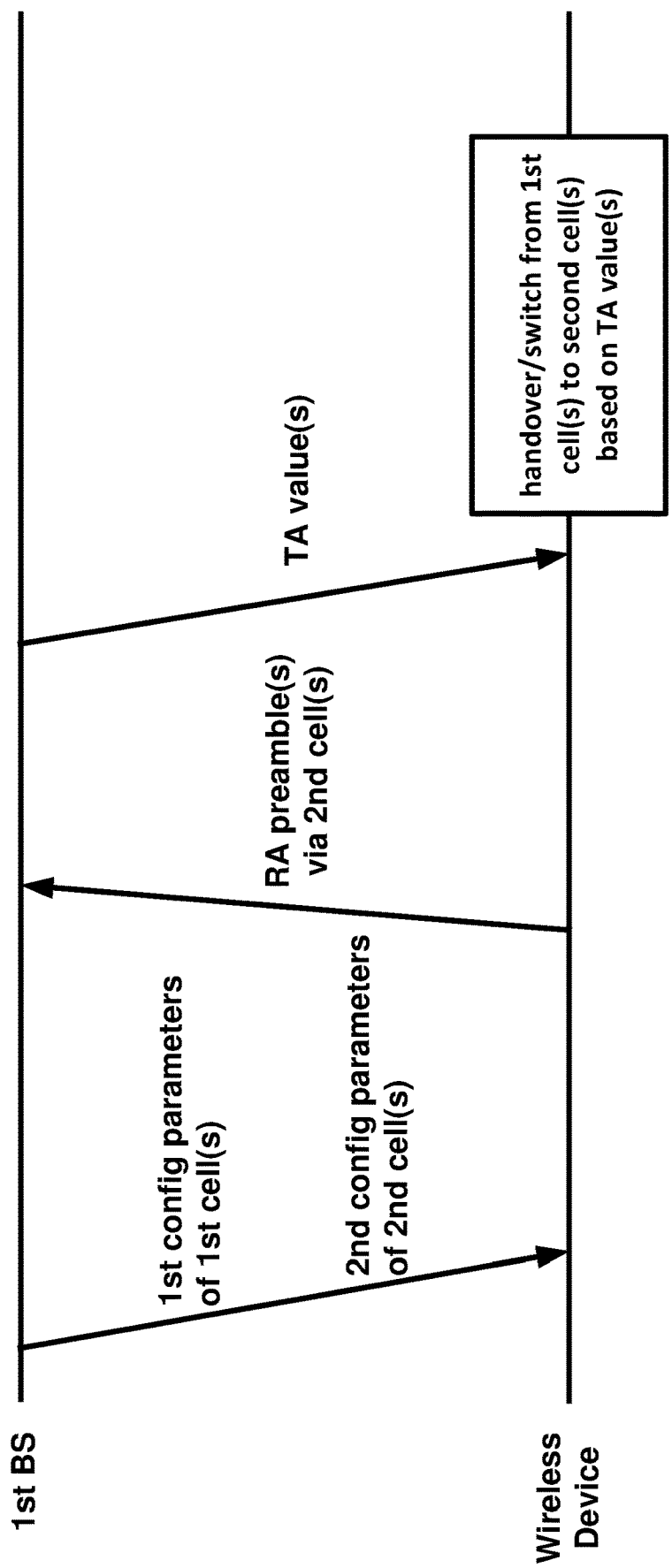
FIG. 31 shows an example process in accordance with several of various embodiments of the present disclosure.
Figure 32:
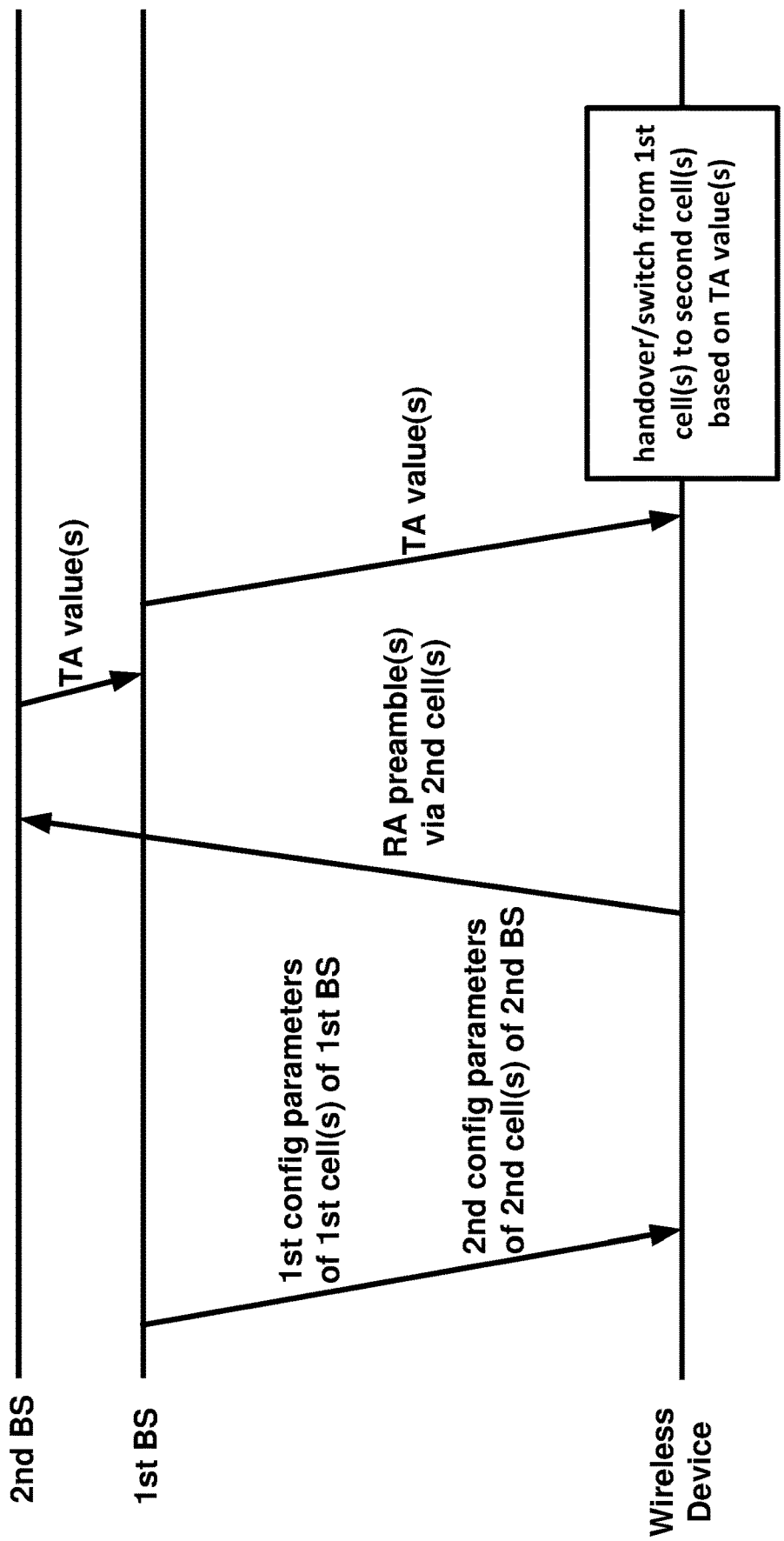
FIG. 32 shows an example process in accordance with several of various embodiments of the present disclosure.

In an example embodiment as shown in FIG. 21, the wireless device may obtain one or more timing advance (TA) values (e.g., one or more TA values associated with the one or more second cells) prior to the initiating the one or more handover processes (e.g., the handover from the one or more first cells of the first BS to the one or more second cells of the second BS) and/or prior to switching from the one or more first cells to the one or more second cells and/or prior to communicating via the one or more second cells. In an example, the one or more second cells may be in the same timing advance group (TAG). In example embodiments as shown in FIG. 31 and FIG. 32, obtaining the one or more TA values may comprise performing one or more random access processes (e.g., via the one or more second cells). The obtaining the one or more TA values may comprise transmitting one or more random access preambles (e.g., via the one or more second cells) and may receive (e.g., from the first base station) the one or more TA values. In an example, the wireless device may transmit the one or more random access preambles via the one or more second cells to the second BS and the second BS may determine the one or more TA values. The second BS may transmit (e.g., via an application protocol message, e.g., an Xn message) the determined one or more TA values to the first BS and the first BS may transmit the one or more TA values to the wireless device. In an example, receiving the one or more TA values may be based on one or more MAC CEs. The one or more MAC CEs may be based on a first format indicating that the one or more MAC CEs are associated with/used in L1/L2 based mobility/switching. In an example, the one or more MAC CEs may be associated with a first logical channel identifier (LCID) indicating that the one or more MAC CEs are associated with/used in L1/L2 based mobility/switching. In an example, a MAC CE in the one or more MAC CEs may comprise a field (e.g., a TAG ID field) with a value indicating that the MAC CE is associated with/used in L1/L2 based mobility/switching.

Figure 22:
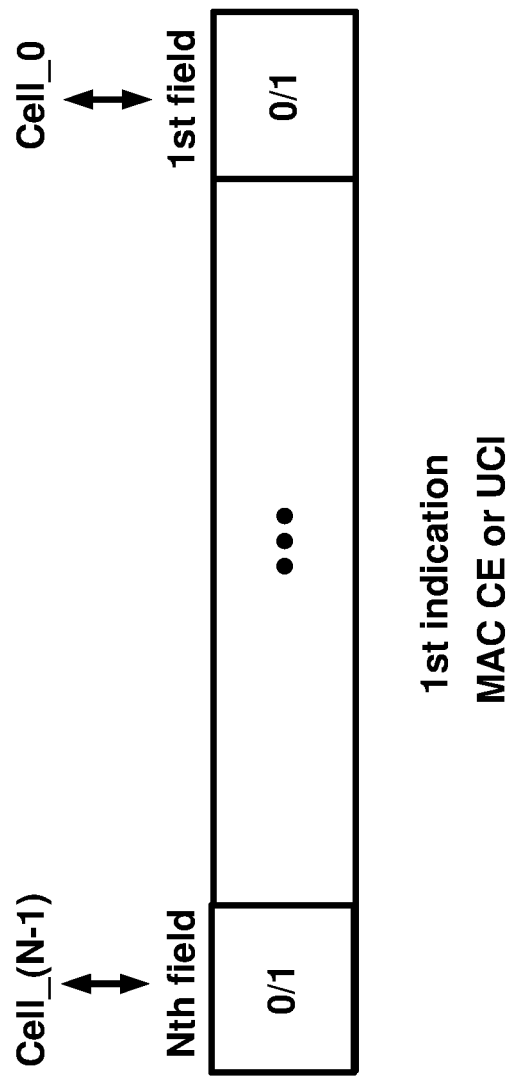
FIG. 22 shows an example MAC CE or uplink control information in accordance with several of various embodiments of the present disclosure.
Figure 23:
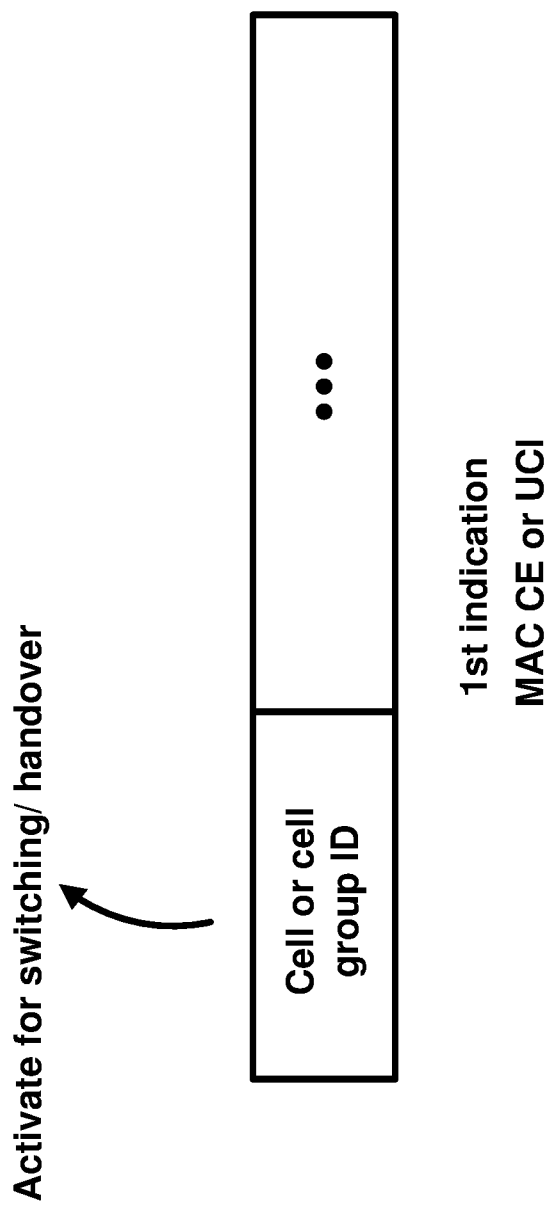
FIG. 23 shows an example MAC CE or uplink control information in accordance with several of various embodiments of the present disclosure.
Figure 24:
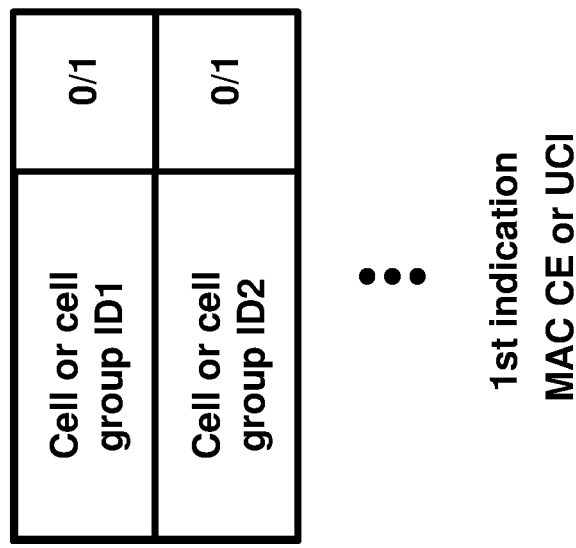
FIG. 24 shows an example MAC CE or uplink control information in accordance with several of various embodiments of the present disclosure.

Example uplink control information (UCI) or MAC CEs (e.g., MAC CE formats) used for the first indication (e.g., first indication of the one or more second cells from the wireless device to the first BS) are shown in FIG. 22, FIG. 23, and FIG. 24. For example, as shown in FIG. 22, the number of the one or more second cells may be N. The UCI or the MAC CE used for transmission of the first indication may comprise a plurality of fields (e.g., N fields, e.g., a bitmap comprising N bits). Each field in the plurality of fields may correspond to a corresponding cell in the one or more second cells. For example, the rightmost field of the UCI/MAC CE may correspond to Cell_0 that corresponds to a cell in a plurality of cells that has the lowest cell index/ID of the cell indexes/IDs of the plurality of cells. The field adjacent to the rightmost field of the UCI/MAC CE may correspond to Cell_1 that corresponds to a cell in a plurality of cells that has the second lowest cell index/ID of the cell indexes/IDs of the plurality of cells. The leftmost field of the UCI/MAC CE may correspond to Cell_(N−1) that corresponds to a cell in a plurality of cells that has the highest cell index/ID of the cell indexes/IDs of the plurality of cells. A value of a field may indicate that the corresponding cell is activated or deactivated for L1/L2 based handover/switching. A value of one may indicate that the corresponding cell is activated for L1/L2 based handover/switching. A value of zero may indicate that the corresponding cell is deactivated for L1/L2 based handover/switching. In an example, as shown in FIG. 22, the first indication may be based on a MAC CE format with a fixed length. For example, as shown in FIG. 23, the UCI/MAC CE used for transmission of first indication may be comprise one or more fields, wherein a value of a field in the one or more fields may indicate an identifier/index of a cell/cell group. The presence of the identifier/index of a cell/cell group may indicate activation of the handover/switching for the cell/cell group corresponding to the identifier/index of a cell/cell group. In an example, as shown in FIG. 23, the first indication may be based on a MAC CE format with a variable length. For example, as shown in FIG. 24, the UCI/MAC CE used for transmission of first indication may comprise a plurality of fields. A first field, in the plurality of fields, may indicate an identifier/index of a cell/cell group and second field, in the plurality of fields, may have a value indicating whether the corresponding cell/cell group is activated or deactivated. For example, a value of one may indicate that the corresponding cell/cell group is activated a value of one may indicate that the corresponding cell/cell group is activated and a value of zero may indicate that the corresponding cell/cell group is deactivated a value of one may indicate that the corresponding cell/cell group is activated. In an example, as shown in FIG. 24, the first indication may be based on a MAC CE format with a variable length.

Figure 25:
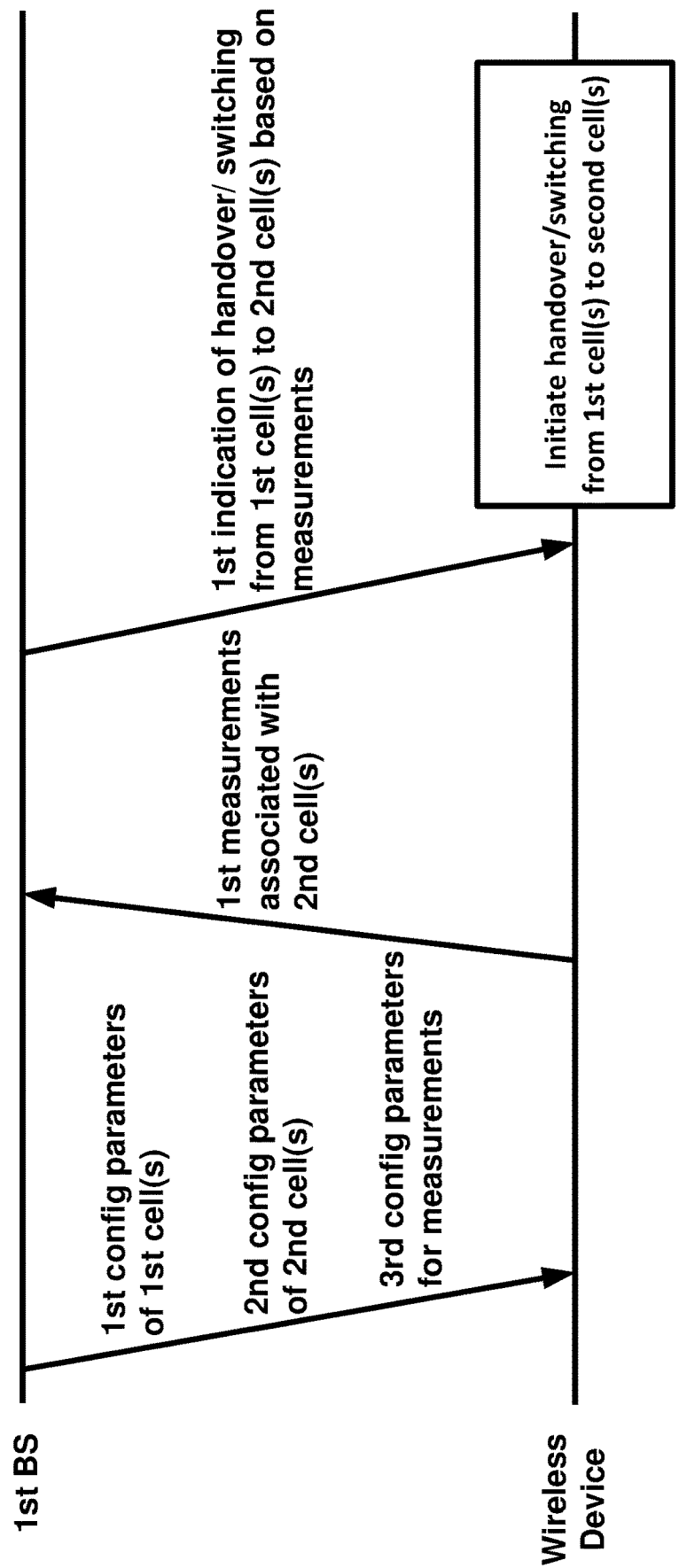
FIG. 25 shows an example process in accordance with several of various embodiments of the present disclosure.
Figure 26:
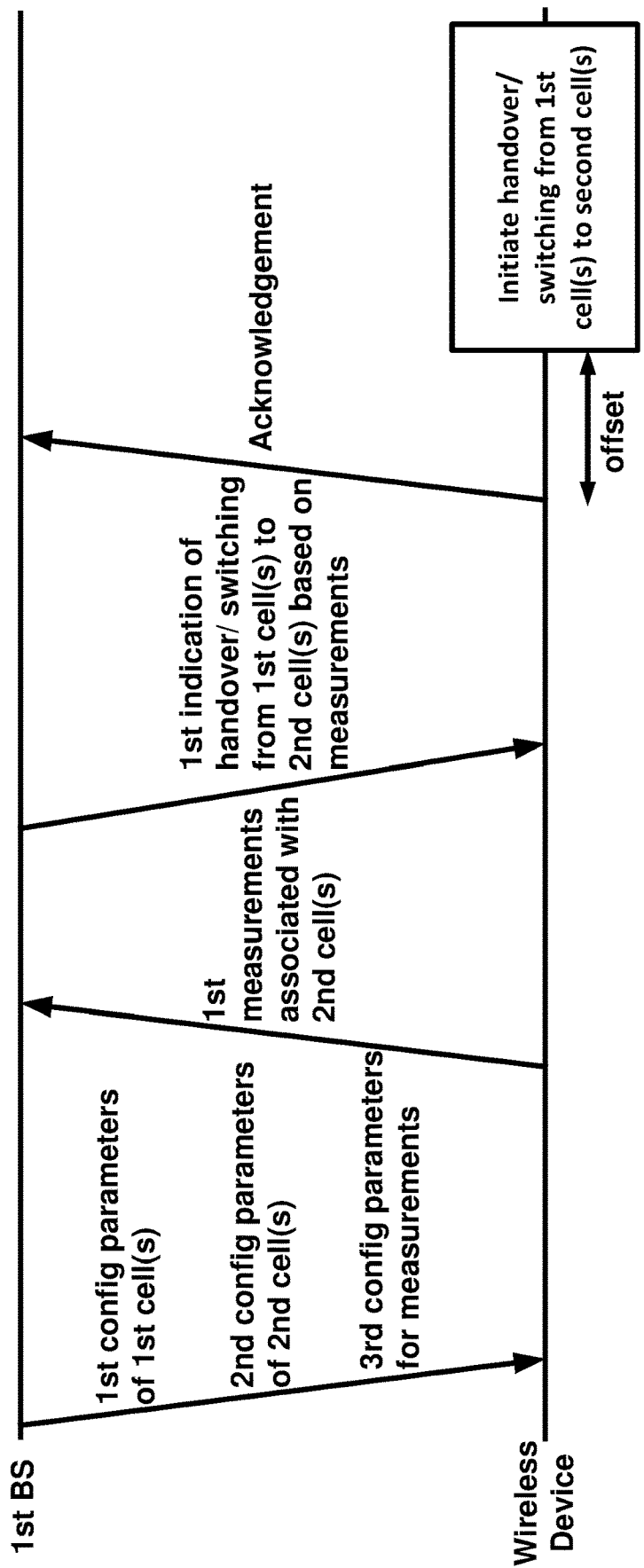
FIG. 26 shows an example process in accordance with several of various embodiments of the present disclosure.
Figure 27:
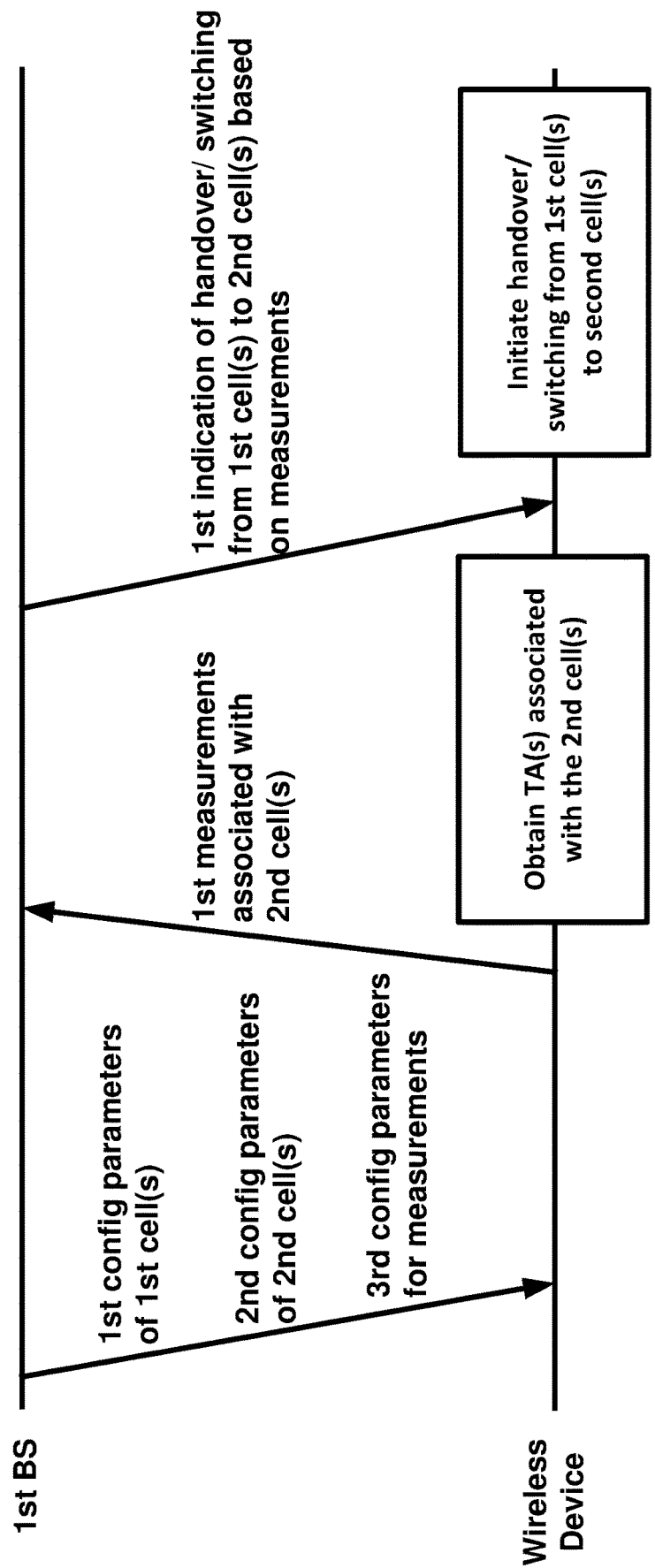
FIG. 27 shows an example process in accordance with several of various embodiments of the present disclosure.

In example embodiments as shown in FIG. 25, FIG. 26 and FIG. 27, the wireless device may receive a first indication of handover/switching from the one or more first cells to the one or more second cells. In an example, the first BS may make a determination (e.g., based on the measurement results received from the wireless device) of handover/switching from the one or more first cells to the one or more second cells and may transmit the first indication based on the determination. In an example, the base station may make a selectin (e.g., based on the measurement results received from the wireless device) of the one or more second cells for handover/switching from the one or more first cells to the one or more second cells and may transmit the first indication that the first base station has made the selection.

In an example, the first indication may be via physical layer signaling or may be via MAC layer signaling.

In an example, in case the first indication is via physical layer signaling, the physical layer signaling may be via downlink control information (e.g., DCI to be transmitted via a downlink control channel) or via a downlink signal (e.g., via a downlink reference signal such as SSB, CSI-RS, DMRS, etc.). In an example a sequence associated with the downlink signal (e.g., a sequence (e.g., a sequence number) associated with the downlink signal, e.g., SSB, CSI-RS or DMRS) may be used for the first indication. The wireless device may receive configuration parameters for reception of (e.g., for determining radio resources for reception of) the first indication via the downlink control channel (e.g., for transmission of the DCI) or based on the downlink signal.

In an example, in case the first indication is MAC layer signaling, the MAC layer signaling for transmission of the first indication may be via a first MAC CE (e.g., a downlink MAC CE). In an example, the first MAC CE may have a first format associated with L1/L2 based handover/switching. In an example, the first MAC CE may be associated with a first LCID that is associated with the L1/L2 based handover/switching. The first MAC CE may be multiplexed in a transport block and the wireless device may receive the transport block based on/via a downlink shared/data channel.

In an example, the one or more first cells may be associated with/of/provided by the first BS and the one or more second cells may be associated with/of/provided by the second BS. The first indication, transmitted by the first BS and received by the wireless device, may indicate the handover from the one or more first cells of the first BS to the one or more second cells of the second BS. In response to receiving the first indication, the wireless device may initiate the handover from the one or more first cells of the first BS to the one or more second cells of the second BS. In an example, the wireless device may initiate the handover based on second configuration parameters of the one or more second cells (e.g., received prior to the indication).

In an example embodiment as shown in FIG. 26, the wireless device may transmit a first acknowledgement in response to reception of the first indication indicating successful reception (e.g., by the wireless device) of the first indication. The wireless device may initiate the handover from the one or more first cells of the first BS to the one or more second cells of the second BS in response to transmission of the first acknowledgement. For example, the wireless device may initiate the handover on/after an offset from a first timing of transmission of the first acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be a HARQ acknowledgement. For example, in case the first indication is via a MAC CE multiplexed in a transport block, the first acknowledgement may indicate successful reception of the transport block (e.g., by the wireless device). The wireless device may initiate the handover from the one or more first cells of the first BS to the one or more second cells of the second BS in response to transmission of the first HARQ acknowledgement. For example, the wireless device may initiate the handover on/after an offset from a first timing of transmission of the first HARQ acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be via a second MAC CE. For example, the second MAC CE may have a zero payload and an LCID associated with the second MAC CE may indicate that the second MAC CE is for an acknowledgement of the first indication. The wireless device may initiate the handover from the one or more first cells of the first BS to the one or more second cells of the second BS in response to transmission of the second MAC CE. For example, the wireless device may initiate the handover on/after an offset from a first timing of transmission of the second MAC CE. In an example, the offset may be in a number of symbols or in a number of slots. In an example, the offset may be pre-configured. In an example, the offset may be configurable, and the wireless device may receive a configuration parameter indicating the offset.

In an example, the initiating the handover from the one or more first cells of the first BS to the one or more second cells of the second BS may comprise initiating one or more random access processes comprising transmitting one or more random access preambles via the one or more second cells. The initiating the one or more random access processes may be based on second configurations parameters of the one or more second cells (e.g., random access configuration parameters indicating random access occasions/parameters).

In an example, in response to reception of the first indication, the wireless device may communicate via the one or more second cells (e.g., may transmit uplink signals/channels or may receive downlink signals/channels via the one or more second cells). In an example, in response to reception of the first indication, the wireless device may switch from the one or more first cells to the one or more second cells. The communication via the one or more second cells and/or switching to the one or more second cells may be based on the second configuration parameters of the one or more second cells.

In an example embodiment as shown in FIG. 26, the wireless device may transmit a first acknowledgement in response to reception of the first indication indicating successful reception (e.g., by the wireless device) of the first indication. The wireless device may communicate via the one or more second cells and/or switch from the one or more first cells to the one or more second cells in response to transmission of the first acknowledgement. For example, the wireless device may communicate via the one or more second cells and/or switch from the one or more first cells to the one or more second cells on/after an offset from a first timing of transmission of the first acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be a HARQ acknowledgement. For example, in case the first indication is via a MAC CE multiplexed in a transport block, the first acknowledgement may indicate successful reception of the transport block (e.g., by the wireless device). The wireless device may communicate via the one or more second cells and/or switch from the one or more first cells to the one or more second cells in response to transmission of the first HARQ acknowledgement. For example, the wireless device may communicate via the one or more second cells and/or switch from the one or more first cells to the one or more second cells on/after an offset from a first timing of transmission of the first HARQ acknowledgement. In an example, the offset may be in a number of symbols or in a number of slots. In an example, the offset may be pre-configured. In an example, the offset may be configurable, and the wireless device may receive a configuration parameter indicating the offset.

In an example, the first acknowledgement may be via a second MAC CE. For example, the second MAC CE may have a zero payload and an LCID associated with the second MAC CE may indicate that the second MAC is for an acknowledgement of the first indication. The wireless device may communicate via the one or more second cells and/or switch from the one or more first cells to the one or more second cells in response to transmission of the second MAC CE. For example, the wireless device may initiate the handover on/after an offset from a first timing of transmission of the second MAC CE. In an example, the offset may be in a number of symbols or in a number of slots. In an example, the offset may be pre-configured. In an example, the offset may be configurable, and the wireless device may receive a configuration parameter indicating the offset.

In an example embodiment as shown in FIG. 27, the wireless device may obtain one or more timing advance (TA) values (e.g., one or more TA values associated with the one or more second cells) prior to the initiating the one or more handover processes (e.g., the handover from the one or more first cells of the first BS to the one or more second cells of the second BS) and/or prior to switching from the one or more first cells to the one or more second cells and/or prior to communicating via the one or more second cells. In example embodiments as shown in FIG. 31 and FIG. 32, obtaining the one or more TA values may comprise performing one or more random access processes (e.g., via the one or more second cells). The obtaining the one or more TA values may comprise transmitting one or more random access preambles (e.g., via the one or more second cells) and may receive (e.g., from the first base station) the one or more TA values. In an example as shown in FIG. 32, the wireless device may transmit the one or more random access preambles via the one or more second cells to the second BS and the second BS may determine the one or more TA values. The second BS may transmit (e.g., via an application protocol message, e.g., an Xn message) the determined one or more TA values to the first BS and the first BS may transmit the one or more TA values to the wireless device. In an example, receiving the one or more TA values may be based on one or more MAC CEs. The one or more MAC CEs may be based on a first format indicating that the one or more MAC CEs are associated with/used in L1/L2 based mobility/switching. In an example, the one or more MAC CEs may be associated with a first logical channel identifier (LCID) indicating that the one or more MAC CEs are associated with/used in L1/L2 based mobility/switching. In an example, a MAC CE in the one or more MAC CEs may comprise a field (e.g., a TAG ID field) with a value indicating that the MAC CE is associated with/used in L1/L2 based mobility/switching.

Figure 28:
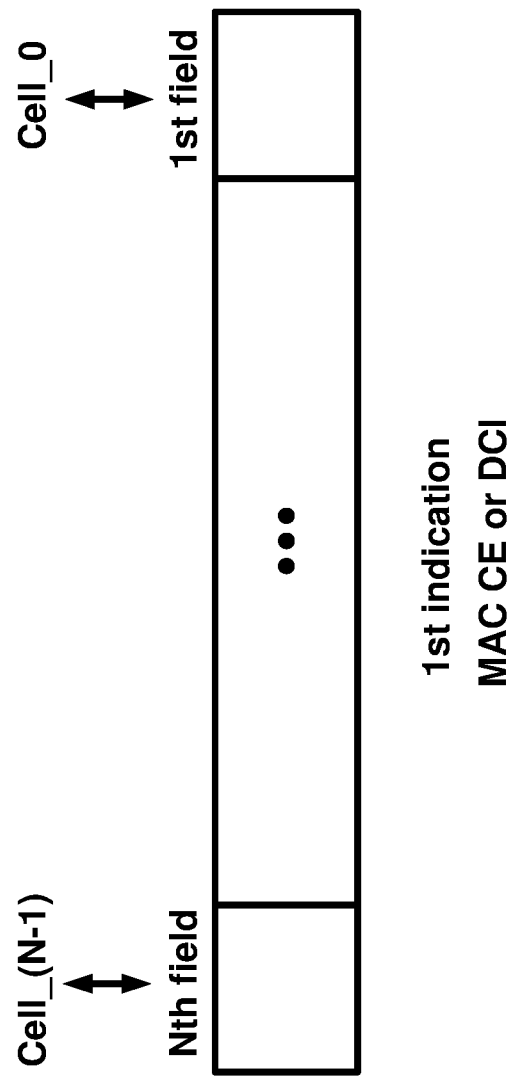
FIG. 28 shows an example MAC CE or downlink control information in accordance with several of various embodiments of the present disclosure.
Figure 29:
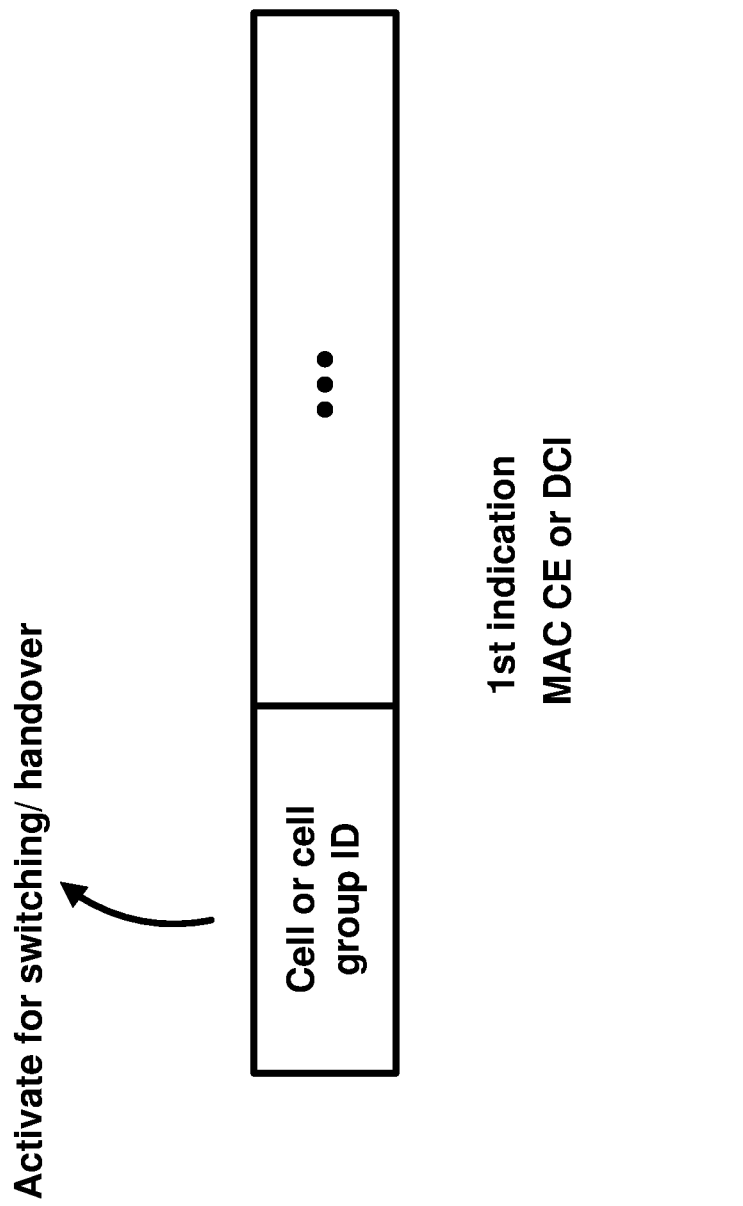
FIG. 29 shows an example MAC CE or downlink control information in accordance with several of various embodiments of the present disclosure.

Example downlink control information (DCI) or MAC CEs (e.g., MAC CE formats) used for the first indication (e.g., first indication of the one or more second cells from the first BS to the wireless device) are shown in FIG. 28, FIG. 29, and FIG. 30. For example, as shown in FIG. 28, the number of the one or more second cells may be N. The DCI or the MAC CE used for transmission of the first indication may comprise a plurality of fields (e.g., N fields, e.g., a bitmap comprising N bits). Each field in the plurality of fields may correspond to a corresponding cell in a plurality of cells (e.g., the one or more second cells). For example, the rightmost field of the DCI/MAC CE may correspond to Cell_0 that corresponds to a cell in a plurality of cells that has the lowest cell index/ID of the cell indexes/IDs of the plurality of cells. The field adjacent to the rightmost field of the DCI/MAC CE may correspond to Cell_1 that corresponds to a cell in a plurality of cells that has the second lowest cell index/ID of the cell indexes/IDs of the plurality of cells. The leftmost field of the DCI/MAC CE may correspond to Cell_(N−1) that corresponds to a cell in a plurality of cells that has the highest cell index/ID of the cell indexes/IDs of the plurality of cells. A value of a field may indicate that the corresponding cell is activated or deactivated for L1/L2 based handover/switching. A value of one may indicate that the corresponding cell is activated for L1/L2 based handover/switching. A value of zero may indicate that the corresponding cell is deactivated for L1/L2 based handover/switching. In an example, as shown in FIG. 28, the first indication may be based on a MAC CE format with a fixed length. For example, as shown in FIG. 29, the DCI/MAC CE used for transmission of first indication may be comprise one or more fields, wherein a value of a field in the one or more fields may indicate an identifier/index of a cell/cell group. The presence of the identifier/index of a cell/cell group may indicate activation of the handover/switching for the cell/cell group corresponding to the identifier/index of a cell/cell group. In an example, as shown in FIG. 29, the first indication may be based on a MAC CE format with a variable length. For example, as shown in FIG. 30, the DCI/MAC CE used for transmission of first indication may be comprise a plurality of fields. A first field, in the plurality of fields, may indicate an identifier/index of a cell/cell group and a second field, in the plurality of fields, may have a value indicating whether the corresponding cell/cell group is activated or deactivated for L1/L2 based handover/switching. For example, a value of one may indicate that the corresponding cell/cell group is activated for L1/L2 based handover/switching and a value of zero may indicate that the corresponding cell/cell group is deactivated for L1/L2 based handover/switching. In an example, as shown in FIG. 29, the first indication may be based on a MAC CE format with a variable length.

Figure 33:
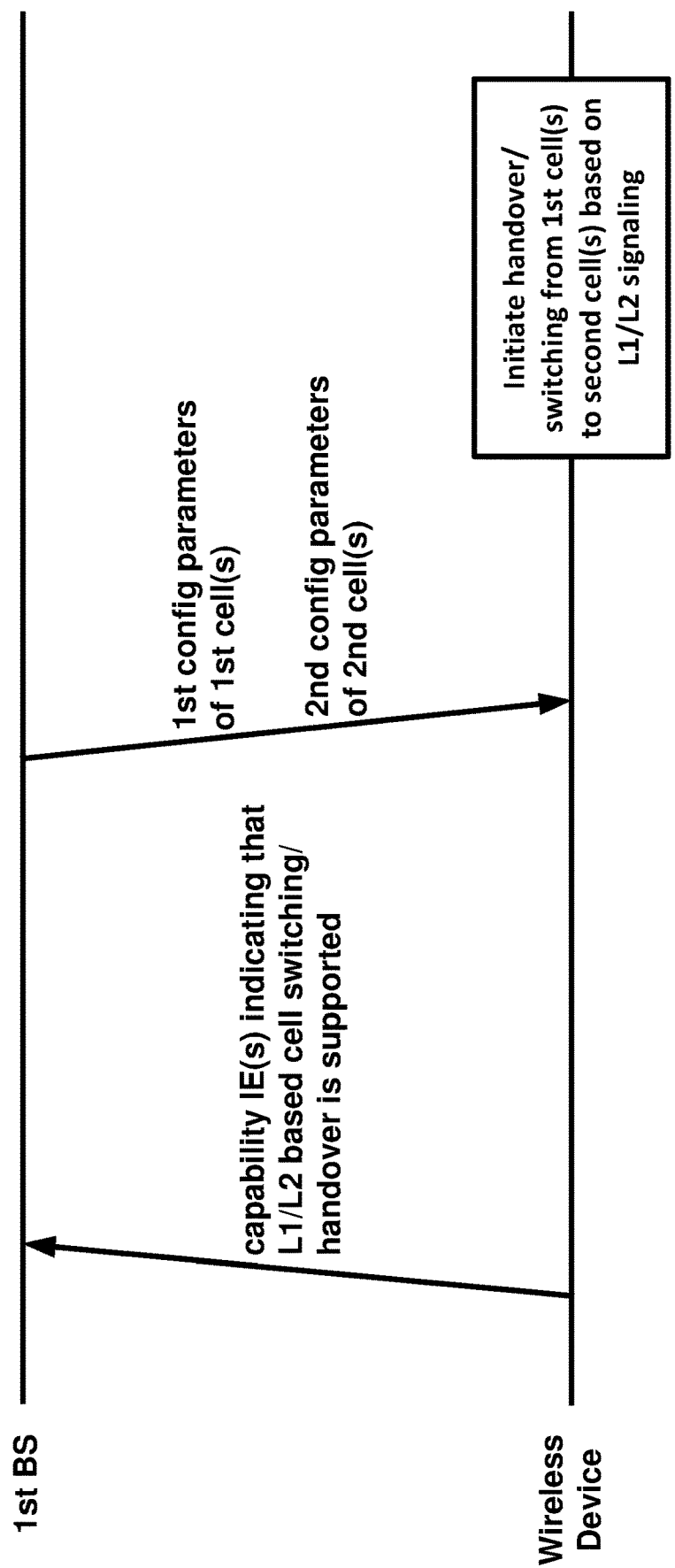
FIG. 33 shows an example process in accordance with several of various embodiments of the present disclosure.

In an example embodiment as shown in FIG. 33, a wireless device may transmit a capability message comprising one or more capability IEs. The one or more capability IEs may indicate that the wireless device is capable of and/or supports cell switching or handover based on L1/L2 signaling (e.g., physical layer or MAC layer signaling). The wireless device may receive, in response to transmission of the capability message, the first configuration parameters of the one or more first cells and the second configuration parameters of the one or more second cells wherein the handover/switching from the one or more first cells to the one or more second cells based on L1/L2 signaling may be enabled/configured. The wireless device may initiate handover/switching from the one or more first cells to the one or more second cells based on L1/L2 signaling in response to receiving the first configuration parameters and the second configuration parameters.

Figure 34:
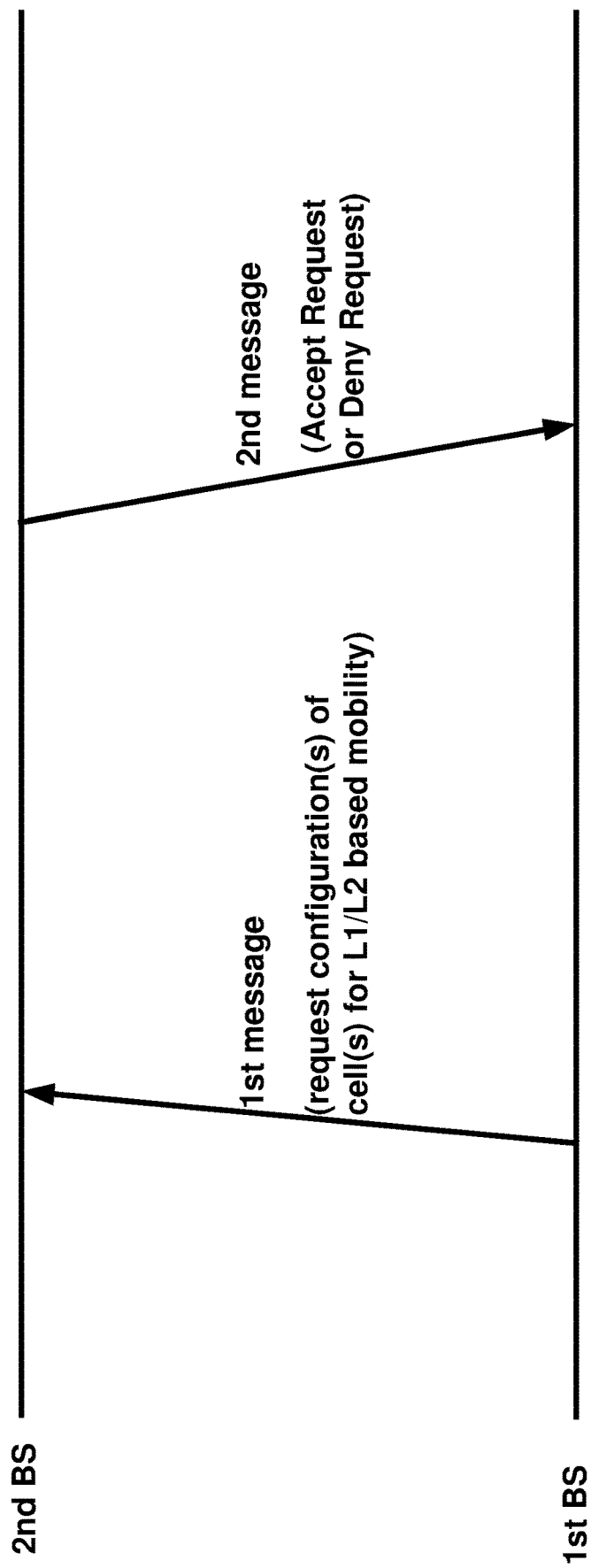
FIG. 34 shows an example process in accordance with several of various embodiments of the present disclosure.
Figure 35:
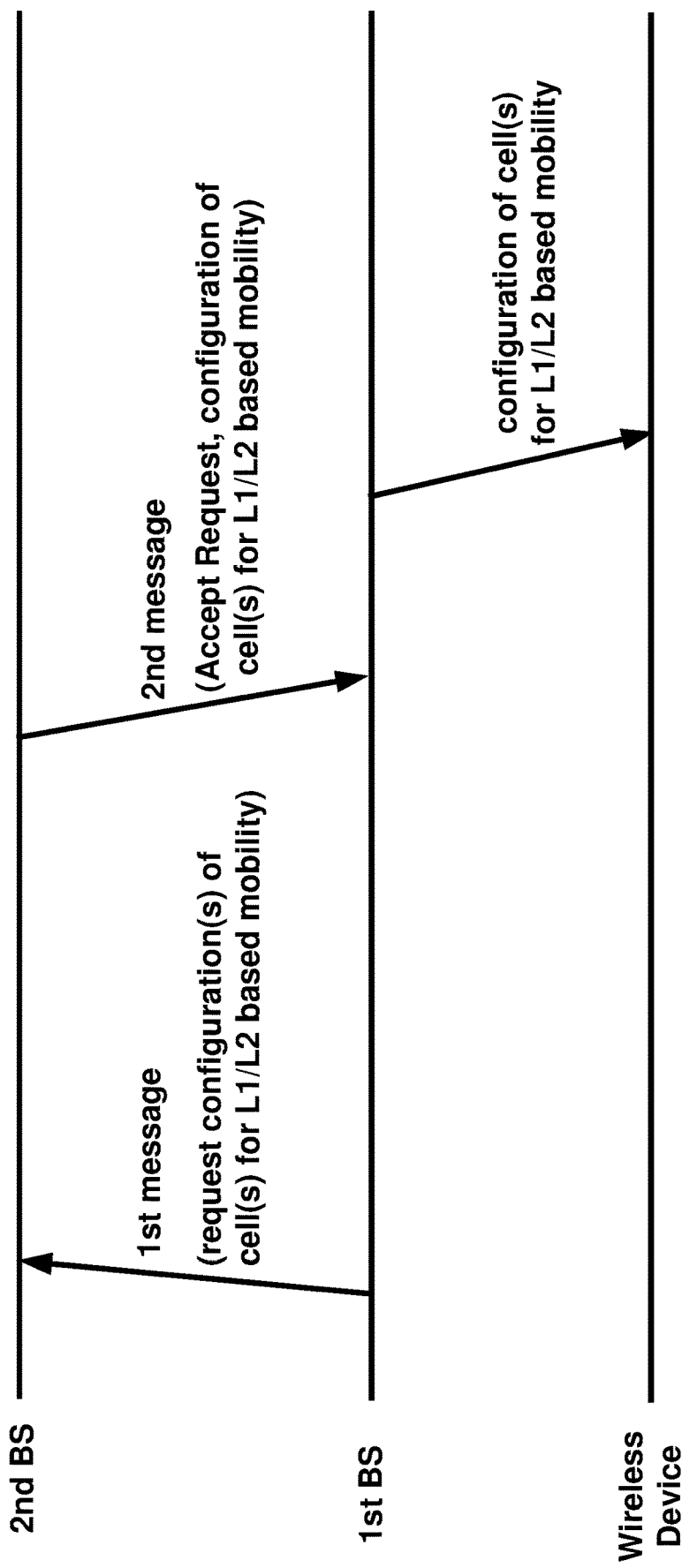
FIG. 35 shows an example process in accordance with several of various embodiments of the present disclosure.

In example embodiments as shown in FIG. 34 and FIG. 35, the first BS may transmit a first application protocol message (e.g., a first Xn message) indicating a request for configuration of one or more cells for handover/inter-cell mobility based on L1/L2 signaling (e.g., physical layer or MAC layer signaling). The first application protocol message may comprise one or more first IEs indicating the request. In an example, transmission of the first application protocol message from the first BS to the second BS may be based on/in response to the first BS receiving, from the wireless device, a capability message comprising one or more capability IEs indicating that the wireless device supports/is capable of handover/inter-cell mobility based on the L1/L2 signaling.

In response to transmission of the first application protocol message to the second BS, the first BS may receive a second application protocol message. In an example embodiment as shown in FIG. 34, the second application protocol message may indicate accepting or denying the request. For example, the second application protocol message may comprise one or more second IEs indicating accepting or denying the request. For example, one or more first values of the one or more second IEs may indicate accepting the request and one or more second values of the one or more second IEs may indicate denying the request. In an example embodiment as shown in FIG. the second application protocol message may comprise (e.g., based on the request being accepted by the second BS) configurations/configuration parameters of the one or more cells for handover/inter-cell mobility based on the L1/L2 signaling.

In an example embodiment, a wireless device may receive, from a first base station, first configuration parameters, second configuration parameters, and third configuration parameters. The first configuration parameters may be for one or more first cells. The second configuration parameters may be for one or more second cells. The third configuration parameters may be for measurements. The wireless device may transmit to the first base station and in response to the measurements, a first indication of handover/switching from the one or more first cells to one or more second cells.

In an example, the one or more first cells may be of/associated with the first base station. The one or more second cells may be of/associated with a second base station. In an example, the first indication may be for handover from the one or more first cells of the first base station to the one or more second cells of the second base station. In an example, the wireless device may initiate, in response to transmitting the first indication, one or more handover processes. In an example, the initiating the one or more handover processes may be based on the second configuration parameters of the one or more second cells. In an example, the wireless device may receive a first acknowledgement, in response to transmitting the first indication. The initiating the one or more handover processes may be in response to receiving the first acknowledgement. In an example, the first acknowledgement may be based on a hybrid automatic repeat request (HARQ) acknowledgement. In an example, the HARQ acknowledgement may indicate successful reception of a transport block comprising the first indication (e.g., in case the first indication is via a MAC CE multiplexed in the transport block). In an example, the initiating the one or more handover processes may be on/started on or after an offset (e.g., a pre-configured offset or a configurable offset) from a timing of the transmission of the first acknowledgement. In an example, the offset may be in a number of symbols or in a number of slots. In an example, the offset may be based on a numerology/subcarrier spacing. In an example, the first acknowledgement may be a second MAC CE (e.g., a MAC CE with zero payload). In an example, the one or more handover processes may comprise transmitting one or more random access preambles via the one or more second cells.

In an example, the first indication may be via physical layer signaling (e.g., uplink control information, transmitted for example via an uplink control channel) or MAC layer signaling (e.g., via one or more MAC CEs).

In an example, the first indication may be that the wireless device has made a determination to switch from the one or more first cells to the one or more second cells. In an example, the wireless device may communicate, in response to transmitting the first indication, via the one or more second cells. In an example, the wireless device may switch, in response to transmitting the first indication, from the one or more first cells to the one or more second cells. In an example, the communicating via the one or more second cells or switching from the one or more first cells to the one or more second cells may be based on the second configuration parameters of the one or more second cells. In an example, the wireless device may receive a first acknowledgement in response to the transmitting the first indication. The communicating via the one or more second cells or switching from the one or more first cells to the one or more second cells may be in response to the receiving the first acknowledgement. In an example, the first acknowledgement may be based on a hybrid automatic repeat request (HARQ) acknowledgement. In an example, the HARQ acknowledgement may indicate successful reception of a transport block comprising the first indication (e.g., in case the first indication is via a MAC CE multiplexed in the transport block). In an example, the communicating via the one or more second cells or switching from the one or more first cells to the one or more second cells may be on/started on or after an offset (e.g., a pre-configured offset or a configurable offset) from a timing of the transmission of the first acknowledgement. In an example, the offset may be in a number of symbols or in a number of slots. In an example, the offset may be based on a numerology/subcarrier spacing. In an example, the first acknowledgement may be based on a second MAC CE (e.g., a MAC CE with zero payload).

In an example, the first indication may be that the wireless device has made a selection of the one or more second cells for the handover/switching from the one or more first cells to the one or more second cells.

In an example, the first indication may be based on first uplink control information. In an example, the transmitting the first uplink control information may be via an uplink control channel. In an example, the wireless device may receive configuration parameters indicating radio resources for transmission of the first uplink control information (e.g., via the uplink control channel). In an example, the transmitting the first uplink control information may be via an uplink shared/date channel. In an example, the wireless device may receive an uplink grant indicating radio resources for transmission of a transport block via the uplink shared channel. The transmitting the first uplink control information may be based on the radio resources indicated by the uplink grant.

In an example, the first indication may be based on a physical layer signal. In an example, the physical layer signal may be a demodulation reference signal (DMRS). In an example, the first indication may be a sequence associated with the physical layer signal (e.g., a sequence number associated with the DMRS). In an example, the physical layer signal (e.g., DMRS) may be transmitted via uplink shared/data channel resources.

In an example, the first indication may be based on a first medium access control (MAC) control element (CE). In an example, the first MAC CE may be associated with a first logical channel identifier (LCID) associated with L1/L2 based handover/signaling. In an example, the first MAC CE may be multiplexed in a transport block. Transmitting the transport block may be based on/via an uplink shared/data channel.

In an example, the wireless device may receive from the first base station, a second indication of one or more third cells of the one or more second cells. In an example, the second indication may be based on a downlink control information (DCI). In an example, the wireless device may receive the downlink control information is via a downlink control channel. In an example, the second indication may be based on a second MAC CE. In an example, the wireless device may transmit a second acknowledgment in response to receiving the second indication. In an example, the second acknowledgement may be based on a hybrid automatic repeat request (HARQ) acknowledgement. In an example, the second acknowledgement may be based on a third MAC CE.

In an example, the one or more second cells may be in the same timing advance group (TAG).

In an example, the wireless device may obtain one or more timing advance (TA) values (e.g., associated with the one or more second cells) prior to the initiating the one or more handover processes and/or prior to the communicating via the one or more second cells. In an example, obtaining the one or more TA values may comprises performing one or more random access processes (e.g., via the one or more second cells). In an example, obtaining the one or more TA values may comprise transmitting one or more random access preambles and receiving the one or more TA values from the first BS. In an example, the second base station may transmit the one or more TA values to the first base station and the first base station may transmit the one or more TA values to the wireless device. In an example, the receiving the one or more TA values may be via one or more MAC CEs. In an example, the one or more MAC CEs may be associated with a first format used for transmission of one or more TAs used in L1/L2 based mobility/switching. In an example, the one or more MAC CEs may be associated with a first logical channel identifier (LCID) indicating that the one or more MAC CEs are used for transmission of one or more TAs used in L1/L2 based mobility/switching. In an example, a MAC CE, in the one or more MAC CEs, may comprise a field (e.g., a TAG ID field) indicating that the MAC CE is used in transmission of a TA used in L1/L2 based mobility/switching.

In an example, the wireless device may transmit a message (e.g., a capability message) comprising one or more capability information elements (IEs) with one or more values indicating that the wireless device supports L1/L2 based (e.g., based on physical layer or MAC layer signaling) mobility (e.g., inter-cell handover) and/or switching. In an example, the receiving the second configuration parameters of the one or more second cells for L1/L2 based mobility (e.g., mobility based on physical layer or MAC layer signaling, e.g., inter-cell handover) and/or switching is in response to/based on the one or more values of the one or more capability IEs indicating that the wireless device supports L1/L2 based mobility and/or switching.

In an example embodiment, a wireless device may receive, from a first base station, first configuration parameters, second configuration parameters and third configuration parameters. The first configuration parameters may be for one or more first cells. The second configuration parameters may be for one or more second cells. The third configuration parameters may be for measurements. The wireless device may transmit to the first base station and based on the third configuration parameters, the measurements comprising first measurements associated with the one or more second cells. The wireless device may receive a first indication of handover/switching from the one or more first cells to one or more second cells.

In an example, the one or more first cells may be of/associated with the first base station. The one or more second cells may be of/associated with a second base station. In an example, the first indication may be for handover from the one or more first cells of the first base station to the one or more second cells of the second base station. In an example, the wireless device may initiate, in response to receiving the first indication, one or more handover processes. In an example, the initiating the one or more handover processes may be based on the second configuration parameters of the one or more second cells. In an example, the wireless device may transmit a first acknowledgement in response to the receiving the first indication. The initiating the one or more handover processes may be in response to the transmitting the first acknowledgement. In an example, the first acknowledgement may be based on a hybrid automatic repeat request (HARQ) acknowledgement. In an example, the HARQ acknowledgement may indicate successful reception of a transport block comprising the first indication (e.g., in case the first indication is via a MAC CE multiplexed in a transport block). In an example, the initiating the one or more handover processes may be on/started on or after an offset (e.g., a pre-configured offset or a configurable offset) from a timing of the reception of the first acknowledgement. In an example, the offset may be in a number of symbols or in a number of slots. In an example, the offset may be based on a numerology/subcarrier spacing. In an example, the first acknowledgement may be based on a second MAC CE (e.g., a MAC CE with zero payload). In an example, the one or more handover processes may comprise transmitting one or more random access preambles via the one or more second cells.

In an example, the first indication may be via physical layer signaling (e.g., downlink control information, received for example via a downlink control channel) or MAC layer signaling (e.g., via one or more MAC CEs).

In an example, the first indication may indicate/instruct switching from the one or more first cells to the one or more second cells. In an example, the wireless device may communicate, in response to receiving the first indication, via the one or more second cells. In an example, the wireless device may switch, in response to receiving the first indication, from the one or more first cells to the one or more second cells. In an example, the communicating via the one or more second cells or switching from the one or more first cells to the one or more second cells may be based on the second configuration parameters of the one or more second cells. In an example, the wireless device may transmit a first acknowledgement in response to the receiving the first indication, wherein the communicating via the one or more second cells or switching from the one or more first cells to the one or more second cells may be in response to the transmitting the first acknowledgement. In an example, the first acknowledgement may be based on a hybrid automatic repeat request (HARQ) acknowledgement. In an example, the HARQ acknowledgement may indicate successful reception of a transport block comprising the first indication (e.g., in case the first indication is via a MAC CE multiplexed in the transport block). In an example, the communicating via the one or more second cells or switching from the one or more first cells to the one or more second cells may be on/started on or after an offset (e.g., a pre-configured offset or a configurable offset) from a timing of the transmission of the first acknowledgement. In an example, the offset may be in a number of symbols or in a number of slots. In an example, the offset may be based on a numerology/subcarrier spacing. In an example, the first acknowledgement may be based on a second MAC CE (e.g., a MAC CE with zero payload).

In an example, the first indication may be that the base station has made a selection of the one or more second cells for the handover/switching from the one or more first cells to the one or more second cells.

In an example, the first indication may be based on first downlink control information. In an example, the receiving the first downlink control information may be via a downlink control channel. In an example, the wireless device may receive configuration used for transmission of the first downlink control information (e.g., via the downlink control channel). In an example, the first downlink control information may be associated with a first format that is associated with/used in L1/L2 based handover/switching. In an example, the first downlink control information may be associated with a first format based on being associated with/used in L1/L2 based handover/switching. In an example, the first downlink control information may be associated with a first RNTI that is associated with/used in L1/L2 based handover/switching. In an example, the first downlink control information may be associated with a first RNTI based on being associated with/used in L1/L2 based handover/switching. In an example, the first downlink control information may comprise a field with a first value indicating that the first downlink control information is associated with/used in L1/L2 based handover/switching. In an example, the first downlink control information may comprise a field with a first value based on the first downlink control information being associated with/used in L1/L2 based handover/switching. In an example, the first indication may be based on a physical layer signal. In an example, the physical layer signal may be a demodulation reference signal (DMRS). In an example, the first indication may be based on a sequence associated with the physical layer signal (e.g., a sequence number associated with DMRS). In an example, the physical layer signal (e.g., DMRS) may be transmitted via uplink shared/data channel resources.

In an example, the first indication may be based on a first medium access control (MAC) control element (CE). In an example, the first MAC CE may be associated with a first logical channel identifier (LCID) that is associated with L1/L2 based handover/switching. In an example, the first MAC CE may be associated with a first logical channel identifier (LCID) based on the first MAC CE being associated/used in L1/L2 based handover/switching. In an example, the first MAC CE may be multiplexed in a transport block. Receiving the transport block may be based on/via a downlink shared/data channel.

In an example, the one or more second cells may be in the same timing advance group (TAG).

In an example, the wireless device may obtain one or more timing advance (TA) values (e.g., associated with the one or more second cells) prior to the initiating the one or more handover processes or prior to the communicating via the one or more second cells. In an example, the obtaining the one or more TA values may comprise performing one or more random access processes (e.g., via the one or more second cells). In an example, the obtaining the one or more TA values may comprise transmitting one or more random access preambles and receiving the one or more TA values from the first BS. In an example, the second BS may transmit the one or more TA values to the first BS and the first BS may transmit the one or more TA values to the wireless device. In an example, the receiving the one or more TA values may be via one or more MAC CEs. In an example, the one or more MAC CEs may be associated with a first format used for transmission of one or more TAs used in L1/L2 based mobility/switching. In an example, the one or more MAC CEs may be associated with a first logical channel identifier (LCID) indicating that the one or more MAC CEs are used for transmission of one or more TAs used in L1/L2 based mobility/switching. In an example, a MAC CE, in the one or more MAC CEs, may comprise a field (e.g., a TAG ID field) indicating that the MAC CE is used in transmission of a TA used in L1/L2 based mobility/switching.

In an example, the wireless device may transmit a message (e.g., a capability message) comprising one or more capability information elements (IEs) with one or more values indicating that the wireless device supports L1/L2 based (e.g., based on physical layer or MAC layer signaling) mobility (e.g., inter-cell handover) and/or switching. In an example, the receiving the second configuration parameters of the one or more second cells for L1/L2 based mobility (e.g., mobility based on physical layer or MAC layer signaling, e.g., inter-cell handover) and/or switching is in response to/based on the one or more values of the one or more capability IEs indicating that the wireless device supports L1/L2 based mobility and/or switching.

In an example embodiment, a first base station (BS) may transmit to a second BS, a first message (e.g., a first application protocol message) indicating (e.g., comprising one or more information elements (IEs) indicating) a request for parameters associated with L1/L2 based mobility/handover (e.g., configuration parameters of one or more cells of the second BS for L1/L2 based mobility, e.g., mobility based on physical layer and/or MAC layer signaling) for a wireless device. The first BS may receive from the second BS in response to the transmitting the first message, a second message (e.g., a second application protocol message) indicating accepting or denying the request.

In an example, based on the request being accepted by the second BS, the first BS may receive, from the second BS, configuration parameters of one or more cells of the second BS for L1/L2 based mobility (e.g., mobility based on physical layer and/or MAC layer signaling).

In an example, the first base station may receive from the wireless device, one or more capability IEs indicating that the wireless device supports L1/L2 based mobility/handover (e.g., mobility/handover based on physical layer and/or MAC layer signaling). The transmitting the first message and/or including the one or more IEs in the first message may be based on the wireless device supporting the L1/L2 based mobility/handover.

Figure 36:
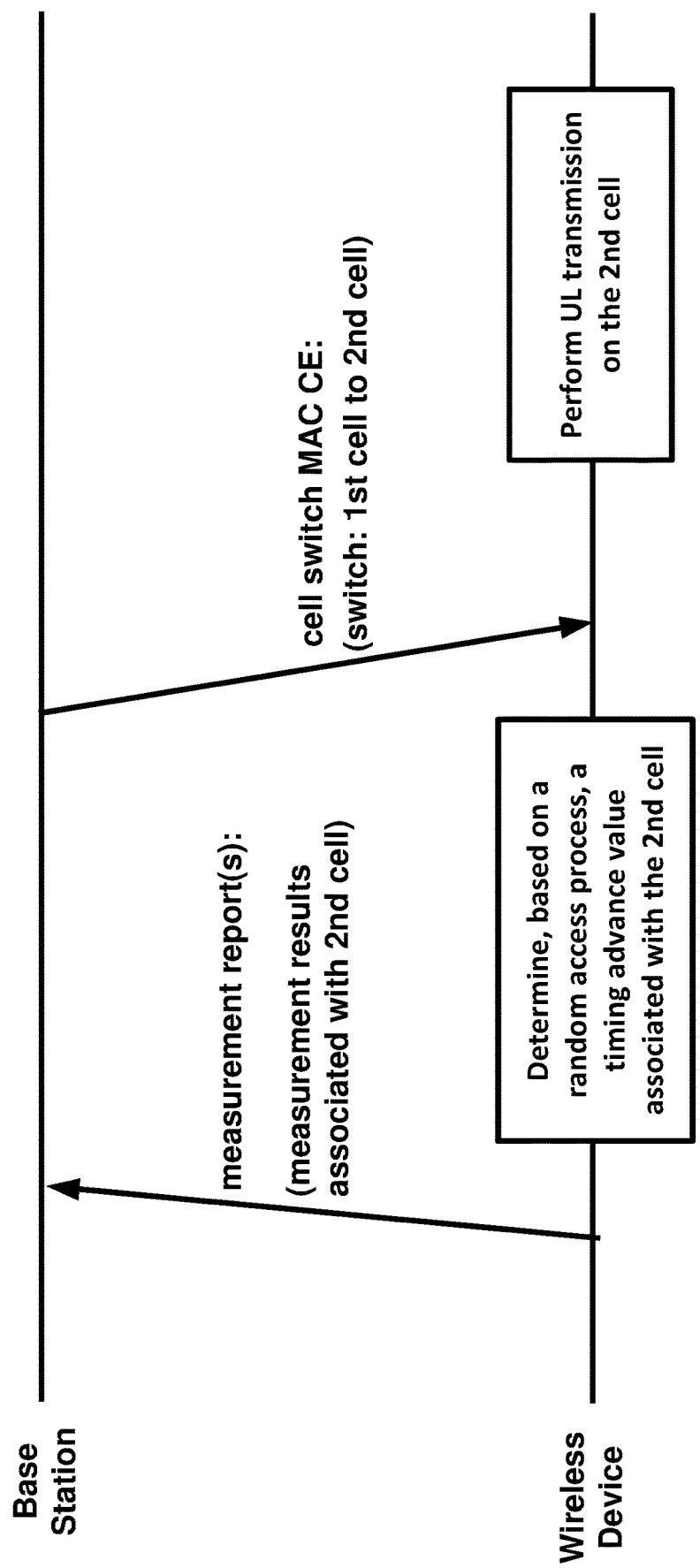
FIG. 36 shows an example process in accordance with several of various embodiments of the present disclosure.

In an example embodiment as shown in FIG. 36, a wireless device may transmit one or more measurement reports. The wireless device may transmit the one or more measurement reports to a first base station. The wireless device may transmit the one or more measurement reports as uplink control information (UCI) transmitted semi-persistently on PUSCH or as aperiodic report(s) on PUSCH or periodically/semi-persistently on PUCCH. The one or more measurement reports may comprise measurement results associated with a second base station. In an example, the measurements results may comprise SSB based L1-RSRP and/or CSI-RS based L1-RSRP and/or may be based on L1-SINR.

The wireless device may determine a timing advance value associated with the second cell. The wireless device may determine the timing advance value prior to receiving a cell switching/handover command (e.g., a cell switch MAC CE). For example, the wireless device may determine the timing advance value based on initiating a random access process. The wireless device may initiate the random access process prior to receiving the cell switching/handover command (e.g., the cell switch MAC CE). In an example, the wireless device may initiate the random access process based on and in response to receiving a PDCCH order, e.g., based on receiving a DCI indicating initiation of the random access process. The PDCCH order may comprise or may be associated with one or more parameters indicating that the random access process is for obtaining a timing advance value that is used in mobility based on L1/L2 signaling. The random access process may comprise transmitting at least one random access preamble. The random access process may comprise transmitting at least one random access preamble via the second cell (e.g., via random access resources/occasions of the second cell). A base station receiving the at least one random access preamble may determine the timing advance value. In an example, the base station receiving the at least one random access preamble may transmit a message (e.g., a random access response (RAR) message) comprising a parameter indicating the timing advance value and the wireless may determine the timing advance value based on the parameter in response to receiving the message (e.g., the random access response (RAR) message). In an example, the wireless device may determine the timing advance value based on the cell switching/handover command (e.g., the cell switch MAC CE). The cell switching/handover command (e.g., the cell switch MAC CE) may comprise a field with a value indicating the timing advance value. In an example, receiving the timing advance value may be via the first cell. The wireless device may transmit the at least one preamble via the first cell (e.g., the first cell of the first base station) and may receive the timing advance value via the second cell (e.g., the second cell of the second base station). In an example, receiving the timing advance value may be based on a MAC CE (e.g., a timing advance MAC CE).

The wireless device may receive configuration parameters of one or more cells as candidate cells for L1/L2 based mobility (e.g., inter-cell mobility). In an example, the configuration parameters of the one or more cells may be full configuration parameters of the one or more cells. In an example, the configuration parameters of the one or more cells may be partial configuration parameters of the one or more cells. The one or more cells may comprise the second cell. In an example, the configuration parameters of the one or more cells may comprise random access configuration parameters, e.g., random access configuration parameters for random access processes on the second cell, e.g., random access configuration parameters of the second cell that are associated with obtaining time advance values for L1/L2 based mobility (e.g., inter-cell mobility). The wireless device may initiate the random access process based on the random access configuration parameters.

The wireless device may receive the cell switch/handover MAC CE indicating switching/handover from the first cell to the second cell. The wireless device may receive a transport block (e.g., via PDSCH) comprising the cell switch/handover MAC CE. In an example, the first cell and the second cell may be provided by/associated with different base stations. The first cell may be provided by/associated with a first base station and the second cell may be provided by/associated with a second base station. The cell switch/handover command/MAC CE may indicate a handover from the first cell of the first base station to the second cell of the second base station. The wireless device may initiate a handover from the first cell of the first base station to the second cell of the second base station in response to receiving the cell switch/handover MAC CE. In an example, the first cell and the second cell may be provide by/associated with the same base station. The cell switch/handover command/MAC CE may indicate switching from the first cell to the second cell, for example may indicate a SpCell change (e.g., a primary cell (PCell) change or a PSCell change for a cell group provided by a secondary base station in case of dual connectivity) and/or change of an SCell. The wireless device may switch from the first cell to the second cell, for example may change a SpCell (e.g., change a primary cell (PCell) or change a PSCell for a cell group provided by a secondary base station in case of dual connectivity) and/or may change of an SCell in response to receiving the cell switch/handover command/MAC CE.

In an example, the cell switch/handover command MAC CE may comprise a field with a value indicating switching to the second cell (e.g., switching from the first cell to the second cell) and/or handover to the second cell (e.g., handover from the first cell to the second cell). In an example, the cell switch/handover command/MAC CE may comprise a field with a value indicating an identifier of the second cell. For example, the configuration parameters of the one or more cells, comprising the second cell and received prior to receiving the cell switch/handover command/MAC CE, may comprise a configuration parameter indicating the identifier of the second cell (e.g., a cell index, e.g., an RRC configured cell identifier/index, a temporary cell identifier/index configured by RRC, etc.).

In an example, the cell switch/handover command MAC CE may comprise a field with a value indicating switching to a cell group (e.g., switching from the first cell group to the second cell group). The first cell group may comprise the first cell and the second cell group may comprise the second cell. In an example, the cell switch/handover command/MAC CE may comprise a field with a value indicating an identifier of the second cell group. For example, the configuration parameters, received prior to receiving the cell switch/handover command/MAC CE, may comprise a configuration parameter indicating the identifier of the second cell group (e.g., an RRC configured identifier/index of the second cell group, a temporary identifier/index of the second cell group configured by RRC, etc.).

In an example, the cell switch/handover command/MAC CE may be a fixed length MAC CE (e.g., irrespective of number of cells to which the cell switching/handover is indicated). In an example, the cell switch/handover command/MAC CE may be a variable length MAC CE (e.g., based on the number of cells to which the cell switching/handover is indicated). The cell switch/handover MAC CE may be associated with an LCID that is associated with L1/L2 based/triggered inter-cell mobility and indicates that the MAC CE is for/associated with L1/L2 based on inter-cell mobility. In an example, the cell switch/handover command/MAC CE may comprise one or more fields. Each field of the one or more fields may be associated with a corresponding cell. A value of a field in the one or more fields may indicate a switching or handover to the cell corresponding to the field. In an example, the cell switch/handover command/MAC CE may comprise one or more bits. Each bit of the one or more bits may be associated with a corresponding cell. A value of a bit in the one or more bits may indicate a switching or handover to the cell corresponding to the bit.

In an example, the reception of the cell switch/handover command/MAC CE may be based on the wireless device being capable of/supporting the L1/L2 signaling based cell switching/handover/inter-cell mobility. The wireless device may transmit a capability message comprising one or more capability information elements indicating that the wireless device is capable of/supports cell switching and/or handover and/or inter-cell mobility based on L1/L2 signaling (e.g., a cell switch/handover MAC CE), e.g., L1/L2 triggered mobility. In response to transmitting the capability message indicating that the wireless device is capable of/supports cell switching and/or handover and/or inter-cell mobility based on L1/L2 signaling (e.g., a cell switch/handover MAC CE), e.g., L1/L2 triggered mobility, the wireless deice may receive configuration parameters of one or more cells (e.g., candidate cells) for cell switching and/or handover and/or inter-cell mobility based on L1/L2 signaling (e.g., a cell switch/handover MAC CE), e.g., L1/L2 triggered mobility.

The wireless device may perform an uplink transmission on the second cell based on the timing advance value and in response to receiving the cell switch/handover MAC CE. The wireless device may perform the uplink transmission on the second cell based on the timing advance value and in response to the switching/handover to the second cell. The timing of performing/initiating the uplink transmission may be based on a timing of an acknowledgement (e.g., HARQ acknowledgement, e.g., ACK) associated with the transport block comprising the cell switch/handover MAC CE, for example on or after the timing of transmitting the acknowledgement. In an example, the timing of performing/initiating the uplink transmission may be an offset (e.g., a configurable offset, e.g., an RRC configurable offset) from the timing of the acknowledgement. The offset may be in a first number of symbols or in a first number of slots. The uplink transmission may be based on the configuration parameters of the second cell (e.g., the configuration parameters received prior to receiving the cell switch/handover MAC CE). The uplink transmission may be for transmission via PUSCH, PRACH, etc.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 37:
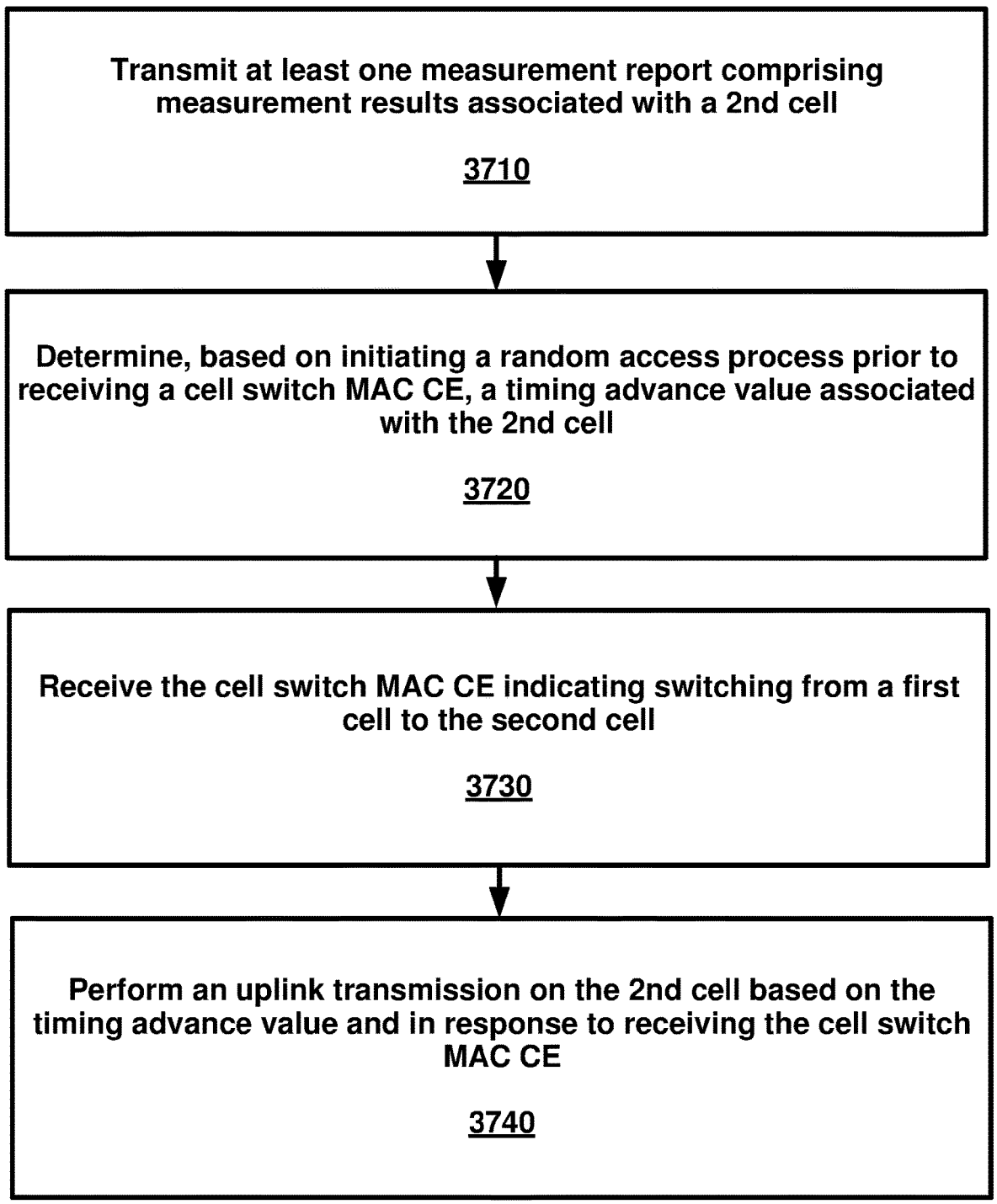
FIG. 37 shows an example flow diagram in accordance with several of various embodiments of the present disclosure.

FIG. 37 shows an example flow diagram in accordance with several of various embodiments of the present disclosure. At 3710, a wireless device may transmit at least one measurement report comprising measurement results associated with a second cell. At 3720, the wireless device may determine, based on initiating a random access process prior to receiving a cell switch medium access control (MAC) control element (CE), a timing advance value associated with the second cell. At 3730, the wireless device may receive the cell switch MAC CE indicating switching from a first cell to the second cell. At 3740, the wireless device may perform an uplink transmission on the second cell based on the timing advance value and in response to receiving the cell switch MAC CE.

In an example embodiment, the first cell may be provided by a first base station. The second cell may be provided by a second base station. The cell switch MAC CE, received at 3730, may indicate a handover from the first cell of the first base station to the second cell of the second base station. In an example embodiment, the wireless device may initiate a handover procedure from the first cell of a first base station to the second cell of a second base station in response to receiving the cell switch MAC CE.

In an example embodiment, the first cell and the second cell may be provided by the same base station.

In an example embodiment, in response to receiving the cell switch MAC CE at 3730, the wireless device may switch from the first cell to the second cell.

In an example embodiment, initiating the random access process may be in response to receiving a physical downlink control channel (PDCCH) order.

In an example embodiment, the random access process may comprise transmitting at least one random access preamble via the second cell. In an example embodiment, the determining the timing advance value, at 3720, may be based on receiving the timing advance value via the first cell. In an example embodiment, the transmitting the at least one random access preamble may be to a first base station and the receiving the timing advance value may be from a second base station.

In an example embodiment, the receiving the timing advance value may be based on receiving a MAC CE.

In an example embodiment, the wireless device may transmit one or more capability messages indicating that the wireless device is capable of and/or supports cell switching and/or handover and/or inter-cell mobility based on L1/L2 signaling (e.g., a cell switch MAC CE), e.g., L1/L2 triggered mobility. In an example embodiment, the wireless device may receive, in response to transmitting the one or more capability messages, configuration parameters of the second cell for cell switching and/or handover and/or inter-cell mobility based on L1/L2 signaling (e.g., a cell switch MAC CE), e.g., L1/L2 triggered mobility. In an example embodiment, the one or more capability messages may comprise one or more capability information elements indicating that the wireless device is capable of and/or supports cell switching and/or handover and/or inter-cell mobility based on L1/L2 signaling (e.g., a cell switch MAC CE), e.g., L1/L2 triggered mobility.

In an example embodiment, the random access process may comprise transmitting at least one random access preamble. The determining the timing advance value, at 3720, may be in response to the transmitting the at least one random access preamble.

In an example embodiment, the wireless device may receive configuration parameters of the second cell prior to receiving the cell switch MAC CE. In an example embodiment, the configuration parameters may comprise random access configuration parameters. The random access process, based on which the timing advance value is determined at 3720, may be based on the random access configuration parameters. In an example embodiment, the performing the uplink transmission, at 3740, may be based on the configuration parameters.

In an example embodiment, the cell switch MAC CE may, received at 3730, may comprise a field with a value indicating a switching to the second cell or handover to the second cell.

In an example embodiment, the cell switch MAC CE, received at 3730, may comprise a field with a value indicating an identifier of the second cell.

In an example embodiment, the cell switch MAC CE, received at 3730, may comprise a field with a value indicating a switching to a cell group. In an example embodiment, the cell group may comprise the second cell.

In an example embodiment, the cell switch MAC CE, received at 3730, may comprise a field with a value indicating an identifier of a cell group.

In an example embodiment, the cell switch MAC CE, received at 3730, may comprise one or more fields. Each field in the one or more fields may be associated with a corresponding cell. A value (e.g., a value of one) of a field in the one or more fields may indicate a switching/handing over to the cell corresponding to the field.

In an example embodiment, the cell switch MAC CE, received at 3730, may comprise a field comprising one or more bits. Each bit in the one or more bits may be associated with a corresponding cell. A value (e.g., a value of one) of a bit in the one or more bits may indicate a switching/handing over to the cell corresponding to the bit.

In an example embodiment, the cell switch MAC CE, received at 3730, may have a fixed length.

In an example embodiment, the cell switch MAC CE, received at 3730, may have a variable length.

In an example embodiment, the cell switch MAC CE, received at 3730, may be associated with a logical channel identifier (LCID). The LCID may indicate that the MAC CE is for cell switching/handover (L1/L2 inter-cell mobility).

In an example embodiment, the receiving the cell switch MAC CE at 3730 may be based on receiving a transport block comprising the cell switch MAC CE. In an example embodiment, the receiving the transport block may be via a physical downlink shared channel (PDSCH).

In an example embodiment, performing the uplink transmission, at 3740, may be in response to/after transmitting an acknowledgement. In an example, the acknowledgement may be a hybrid automatic repeat request (HARQ) acknowledgement. In an example embodiment, the acknowledgement may indicate successful reception of a transport block comprising the cell switch MAC CE. In an example embodiment, performing the uplink transmission, at 3740, may be on or after an offset from transmitting the acknowledgement. In an example embodiment, the offset may be in a first number of symbols or in a first number of slots. In an example embodiment, the wireless device may receive a configuration parameter indicating the offset.

Figure 38:
FIG. 38 shows an example flow diagram in accordance with several of various embodiments of the present disclosure.

FIG. 38 shows an example flow diagram in accordance with several of various embodiments of the present disclosure. At 3810, a first base station may transmit, to a second base station, a first message indicating a request associated with handover/inter-cell mobility based on L1/L2 signaling. At 3820, in response to transmitting the first message, the first base station may receive a second message indicating accepting or denying the request.

In an example embodiment, at least one of the first message, transmitted at 3810, and the second message, received at 3820, may be an application protocol message.

In an example embodiment, at least one of the first message, transmitted at 3810, and the second message, received at 3820, may be an Xn message.

In an example embodiment, the first message, transmitted at 3810, may comprise one or more information elements indicating (e.g., with one or more values indicating) the request.

In an example embodiment, the second message, received at 3820, may comprise one or more information elements indicating (e.g., with one or more values indicating) accepting or denying the request. In an example embodiment, one or more first values of the one or more information elements may indicate accepting the request. One or more second values of the one or more information elements may indicate denying the request.

In an example embodiment, the transmitting the first message/request at 3810, by the first base station to the second base station, is in response to receiving, by the first base station from a wireless device, a capability message indicating that the wireless device is capable of and/or supports handover/inter-cell mobility based on the L1/L2 signaling.

In an example embodiment, the first base station may receive, from the second base station, configuration parameters of one or more cells for L1/L2 based/triggered handover/inter-cell mobility. In an example embodiment, the first base station may transmit the configuration parameters to the wireless device.

In an example embodiment, the first base station may transmit, to the wireless device, a cell switch medium access control (MAC) control element (CE) indicating handover to a first cell of the one or more cells.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of a plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
receiving, by a wireless device prior to receiving a cell switch medium access control (MAC) control element (CE), configuration parameters of a second cell, wherein the configuration parameters comprise random access configuration parameters;
transmitting at least one measurement report comprising measurement results associated with the second cell;
transmitting, based on the random access configuration parameters, a random access preamble prior to receiving the cell switch MAC CE;
receiving the cell switch MAC CE indicating switching from a first cell to the second cell; and
performing an uplink transmission on the second cell based on a timing advance value and in response to receiving the cell switch MAC CE, wherein the timing advance value is determined in response to transmitting the random access preamble.

2. The method of claim 1, wherein:
the first cell is provided by a first base station;
the second cell is provided by a second base station; and
the cell switch MAC CE indicates a handover from the first cell of the first base station to the second cell of the second base station.

3. The method of claim 1, wherein the first cell and the second cell are provided by the same base station.

4. The method of claim 1, wherein the transmitting the random access preamble is in response to receiving a physical downlink control channel (PDCCH) order.

5. The method of claim 1, wherein the timing advance value is determined based on receiving the timing advance value via the first cell.

6. A wireless device comprising:
one or more processors; and
memory storing instructions that, when executed by the one or more processors, cause the wireless device to:
receive, prior to receiving a cell switch medium access control (MAC) control element (CE), configuration parameters of a second cell, wherein the configuration parameters comprise random access configuration parameters;
transmit at least one measurement report comprising measurement results associated with the second cell;
transmit, based on the random access configuration parameters, a random access preamble prior to receiving the cell switch MAC CE;
receive the cell switch MAC CE indicating switching from a first cell to the second cell; and
perform an uplink transmission on the second cell based on a timing advance value and in response to receiving the cell switch MAC CE, wherein the timing advance value is determined in response to transmitting the random access preamble.

7. The wireless device of claim 6, wherein:
the first cell is provided by a first base station;
the second cell is provided by a second base station; and
the cell switch MAC CE indicates a handover from the first cell of the first base station to the second cell of the second base station.

8. The wireless device of claim 6, wherein the first cell and the second cell are provided by the same base station.

9. The wireless device of claim 6, wherein the transmitting the random access preamble is in response to receiving a physical downlink control channel (PDCCH) order.

10. The wireless device of claim 6, wherein the timing advance value is determined based on receiving the timing advance value via the first cell.

11. A system comprising:
a first base station; and
a wireless device comprising: one or more processors; and memory storing instructions that, when executed by the one or more processors, cause the wireless device to:
receive, from the base station prior to receiving a cell switch medium access control (MAC) control element (CE), configuration parameters of a second cell, wherein the configuration parameters comprise random access configuration parameters; transmit at least one measurement report comprising measurement results associated with the second cell; transmit, based on the random access configuration parameters, a random access preamble prior to receiving the cell switch MAC CE; receive the cell switch MAC CE indicating switching from a first cell to the second cell; and perform an uplink transmission on the second cell based on a timing advance value and in response to receiving the cell switch MAC CE, wherein the timing advance value is determined in response to transmitting the random access preamble.

12. The system of claim 11, wherein:
the first cell is provided by the first base station;
the second cell is provided by a second base station; and
the cell switch MAC CE indicates a handover from the first cell of the first base station to the second cell of the second base station.

13. The system of claim 11, wherein the first cell and the second cell are provided by the first base station.

14. The system of claim 11, wherein the transmitting the random access preamble is in response to receiving a physical downlink control channel (PDCCH) order.

* * * * *